(12) United States Patent
Baker et al.

(10) Patent No.: US 9,501,838 B1
(45) Date of Patent: Nov. 22, 2016

(54) SYSTEMS AND METHODS FOR DETERMINING BOUNDARIES OF FEATURES IN DIGITAL IMAGES

(71) Applicant: The Boeing Company, Huntington Beach, CA (US)

(72) Inventors: Anthony W. Baker, Gilbertsville, PA (US); Mark Anthony Rivera, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/834,095

(22) Filed: Aug. 24, 2015

(51) Int. Cl.
*G06K 9/34* (2006.01)
*G06K 9/46* (2006.01)
*G06K 9/66* (2006.01)
*G06T 7/00* (2006.01)
*G06T 7/40* (2006.01)
*G06T 7/20* (2006.01)

(52) U.S. Cl.
CPC ............ *G06T 7/0085* (2013.01); *G06T 7/0081* (2013.01); *G06T 7/408* (2013.01); *G06K 2009/4666* (2013.01); *G06T 7/2033* (2013.01); *G06T 2207/10024* (2013.01)

(58) Field of Classification Search
CPC . G06T 7/0081; G06T 7/0083; G06T 7/0085; G06T 7/2033; G06K 2009/4666

USPC ................................................. 382/164, 190
See application file for complete search history.

(56) References Cited

U.S. PATENT DOCUMENTS

| 6,006,226 | A | 12/1999 | Cullen et al. |
| 7,171,047 | B2* | 1/2007 | Grinchuk ............ G06T 7/0006 382/199 |
| 7,529,343 | B2 | 5/2009 | Safai et al. |
| 8,055,026 | B2 | 11/2011 | Pedersen |
| 8,103,102 | B2 | 1/2012 | Chien et al. |
| 8,195,005 | B2 | 6/2012 | Huang |
| 8,515,178 | B2 | 8/2013 | Zhou |
| 8,761,338 | B2 | 6/2014 | Safai |
| 2002/0054694 | A1* | 5/2002 | Vachtsevanos ...... G01N 21/956 382/111 |
| 2006/0008150 | A1 | 1/2006 | Zhao et al. |
| 2008/0013821 | A1* | 1/2008 | Macgregor ......... G05B 13/048 382/141 |
| 2014/0064623 | A1 | 3/2014 | Kang et al. |
| 2014/0270359 | A1 | 9/2014 | Baker |
| 2014/0286576 | A1 | 9/2014 | Nonogaki |

* cited by examiner

*Primary Examiner* — Kanjibhai Patel
(74) *Attorney, Agent, or Firm* — Armstrong Teasdale LLP

(57) ABSTRACT

A boundary determination system for determining boundaries of features in a digital image is provided. The boundary determination system includes a processor coupled to a memory. The processor is configured to analyze a spectral content and a spatial structure of a feature in a digital image, characterize the feature in the digital image, and distinguish the feature from immediate surroundings of the feature in the digital image.

19 Claims, 22 Drawing Sheets

SYSTEMS AND METHODS FOR DETERMINING BOUNDARIES OF FEATURES IN DIGITAL IMAGES

BACKGROUND

The present disclosure relates generally to analyzing remote sensing images and more specifically to determining boundaries of features in low contrast remote sensing images.

Extracting buildings and features is a critical process for intelligence and simulation environments in remote sensing. In low contrast raster data sets, the boundary of an object becomes difficult to identify with first-order principle means. Most known solutions revolve around a set of skilled analysts manually digitizing various features (buildings, roads, etc.) in remote sensing images. A skilled analyst may spend 9-10 seconds per building digitizing the boundary. In addition, semi-automated solutions include using imagery analysis to determine the boundary of an object. These methods fail in the case of low contrast. The issue is that there is not a uniform contrast from one part of an object's boundary to a separate part of the boundary.

BRIEF DESCRIPTION

A boundary determination system for determining boundaries of features in a digital image is provided. The boundary determination system includes a processor coupled to a memory. The processor is configured to analyze a spectral content and a spatial structure of a feature in a digital image, characterize the feature in the digital image, and distinguish the feature from immediate surroundings of the feature in the digital image.

In another aspect, a method for determining boundaries of features in a digital image is provided. The method is performed by a boundary determination computing device. The method includes receiving, by the boundary determination computing device, a selection of an area in a digital image. The method additionally includes performing, by the boundary determination computing device, a principal component analysis on spectral signatures of pixels in the selected area in the digital image, including determining a centroid representing an average spectral signature and at least one ellipsoid representing a variance in the spectral signatures. Additionally, the method includes generating, by the boundary determination computing device, a boundary around the selected area based on the principal component analysis. Further, the method includes identifying, by the boundary determination computing device, additional pixels outside the boundary to include within the boundary based on determining that additional spectral signatures of the additional pixels fall within the at least one ellipsoid. The method also includes identifying, by the boundary determination computing device, an inflection point in an amount of pixels covered by dilation of the boundary. The method additionally includes dilating, by the boundary determination computing device, the boundary to include at least a subset of the additional pixels without exceeding the inflection point.

In another aspect, a computer-readable medium having computer-executable instructions stored thereon is provided. When executed by a boundary determination computing device including a processor, the computer-executable instructions cause the boundary determination computing device to receive a selection of an area in a digital image, perform a principal component analysis on spectral signatures of pixels in the selected area in the digital image, including determining a centroid representing an average spectral signature and at least one ellipsoid representing a variance in the spectral signatures, generate a boundary around the selected area based on the principal component analysis, identify additional pixels outside the boundary to include within the boundary based on determining that additional spectral signatures of the additional pixels fall within the at least one ellipsoid, identify an inflection point in an amount of pixels covered by dilation of the boundary, and dilate the boundary to include at least a subset of the additional pixels without exceeding the inflection point.

DETAILED DESCRIPTION

Figure 1:
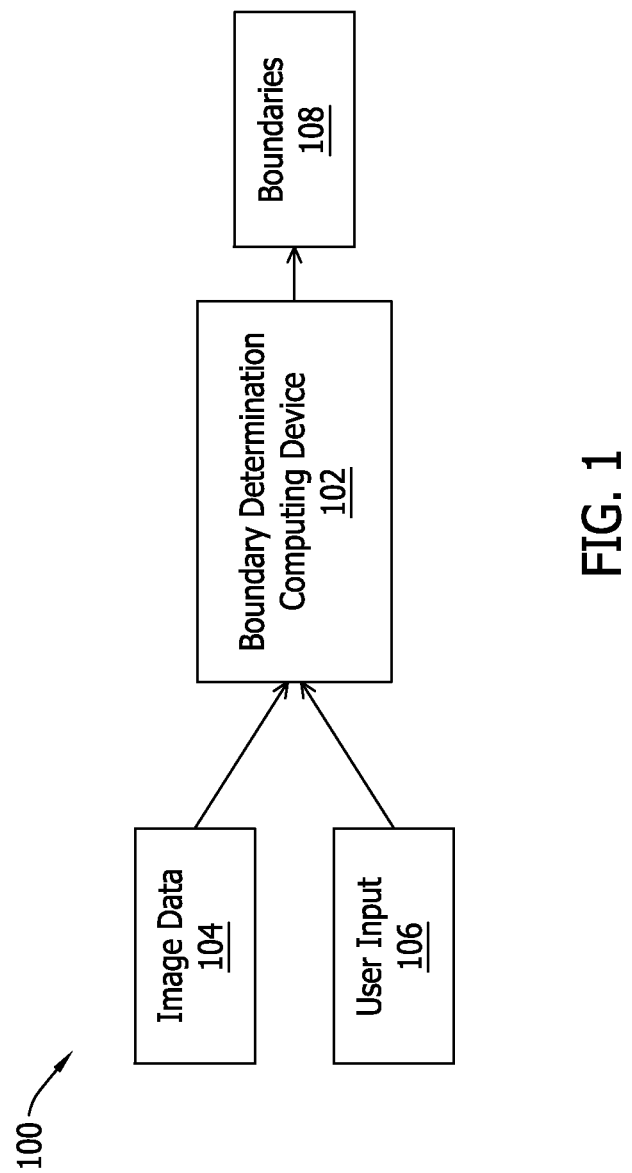
FIG. 1 is a diagram of an example environment in which a boundary determination computing device operates.

The systems and methods described herein solve the problem of extracting the local boundary of a feature when analyzing low contrast remote sensing data. A feature is characterized by a unique spectral signature that is spatially localized. When the surrounding areas of a feature are very similar in spectral content, the spatial boundary at one or more edges of the feature becomes very difficult to determine. When faced with this situation, the boundary needs to be determined first locally. The issue becomes that there is not a uniform contrast from one part of the object's boundary to a separate part of the boundary. In order to solve the problem in low contrast areas, the process needs to be locally adaptive.

The systems and methods described herein are part of a process that reduces the steps to extract features to a reduced number of mouse clicks (in most situations) and provides built in manual control. The systems and methods described herein use the novel technique of examining the contours/iso-lines of a metric associated with the Principal Component Analysis. The novel observation is that the geometric shapes of the iso-lines do not change rapidly until the boundary of the object has been breached. By examining the iso-lines, the local boundary can be determined and the exterior of the boundary can be determined. In addition the Principal Component Analysis is used in order to group pixels. The Principal Component Analysis enhances the ability to associate noisy data (e.g., pixels) into a coherent metric space. The result is that objects with complex patterns can be grouped and identified as a single object. Implementations of the systems and methods described herein provide (i) remote sensing feature extraction based on blob dilation within level sets (or contours) derived from Principal Component Analysis; (ii) a propagating edge process for remote sensing feature extraction by boundary detection of polygonal shapes; and (iii) a vertex repositioning process for remote sensing feature extraction by boundary detection of polygonal shapes.

As described herein, a boundary determination system for determining boundaries of features in a digital image is provided. The boundary determination system includes a processor coupled to a memory. The processor is configured to receive a selection of an area in a digital image, perform a principal component analysis on spectral signatures of pixels in the selected area in the digital image, including determining a centroid representing an average spectral signature and at least one ellipsoid representing a variance in the spectral signatures, generate a boundary around the selected area based on the principal component analysis, identify additional pixels outside the boundary to include within the boundary based on determining that additional spectral signatures of the additional pixels fall within at least one ellipsoid, identify a discontinuity in an amount of pixels contained by dilation of the boundary, and dilate the boundary to include at least a subset of the additional pixels without exceeding a threshold determined by the discontinuity.

FIG. 1 is a diagram of an example environment 100 in which a boundary determination computing device 102 operates. More specifically, boundary determination computing device 102 receives image data 104, for example one or more digital images. Additionally, in at least some implementations, boundary determination computing device 102 receives user input 106 from at least one user 201 (see FIG. 2). User input 106 includes, for example, a selection of a region within a digital image, as described in more detail herein.

Figure 2:
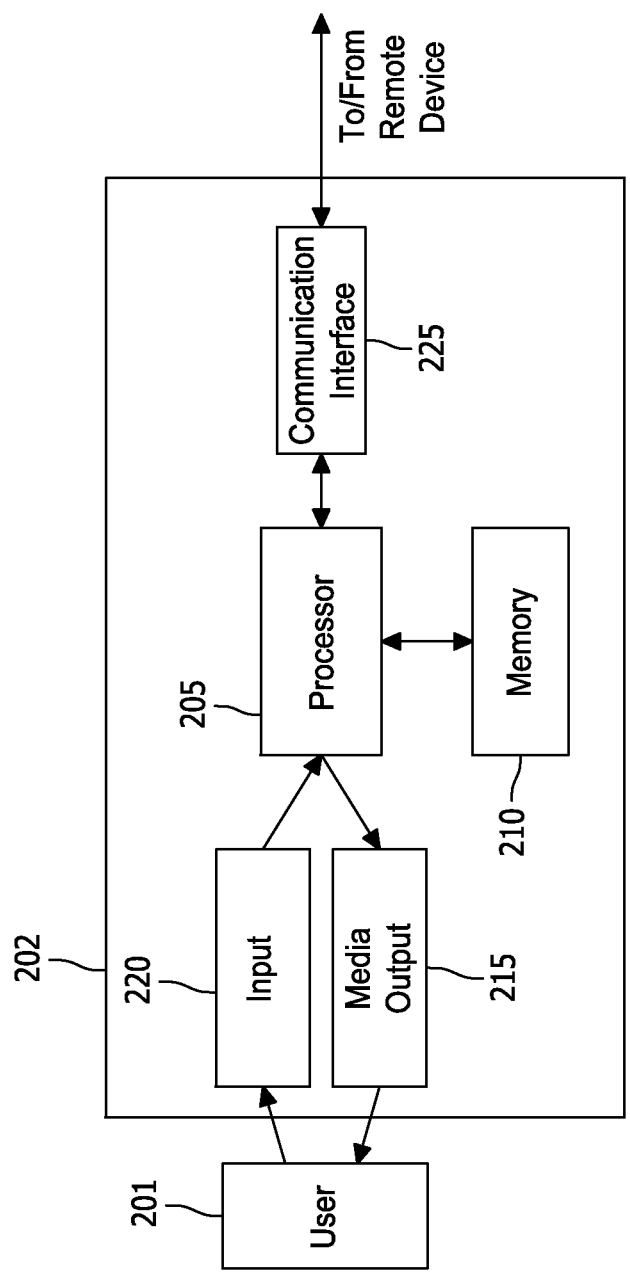
FIG. 2 is a diagram of an example computing device.

FIG. 2 is a diagram of an example computing device 202. Computing device 202 is representative of boundary determination computing device 102 as well as one or more remote devices (not shown) that communicate data to and/or from boundary determination computing device 102. For example, in some implementations, boundary determination computing device 102 receives user input 106 from a client computing device that is communicatively coupled to boundary determination computing device 102. Computing device 202 includes one or more processors 205 for executing instructions. In some implementations, executable instructions are stored in a memory device 210. Processor 205 may include one or more processing units (e.g., in a multi-core configuration). One or more memory devices 210 are any one or more devices allowing information such as executable instructions and/or other data to be stored and retrieved. One or more memory devices 210 may include one or more computer-readable media. More specifically, memory device 210 is any computer-operated hardware suitable for storing and/or retrieving data. Depending on the implementation, memory device 210 includes one or more of random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program and/or data. In some embodiments, storage device 210 is integrated in computing device 202. For example, computing device 202 may include one or more hard disk drives as memory device 210. In other embodiments, memory device 210 is external to computing device 202 and may be accessed by a plurality of computing devices 202. For example, memory device 210 may include multiple storage units such as hard disks or solid state disks in a redundant array of inexpensive disks (RAID) configuration. Memory device 210 may include a storage area network (SAN) and/or a network attached storage (NAS) system.

Computing device 202 also includes at least one media output component 215 for presenting information to a user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some implementations, computing device 202 includes an input device 220 for receiving input from user 201. Input device 220 may include, for example, a keyboard, a pointing device, a mouse, a stylus, a touch sensitive panel (e.g., a touch pad or a touch screen), or an audio input device. A single component such as a touch screen may function as both an output device of media output component 215 and input device 220.

Computing device 202 additionally includes a communication interface 225, which is communicatively couplable to another device (not shown). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 210 are, for example, computer-readable instructions for providing a user interface to user 201 via media output component 215 and, optionally, receiving and processing input from input device 220. A user interface may include, text, graphics, and/or sound that enable user 201 to interact with computing device 202, for example to control operations of computing device 202 and/or view output. In the example of boundary determination computing device 102, the computer-readable instructions additionally cause boundary determination computing device 102 to perform processes for determining one or more boundaries of features (e.g., objects) in images, as described herein.

Figure 3:
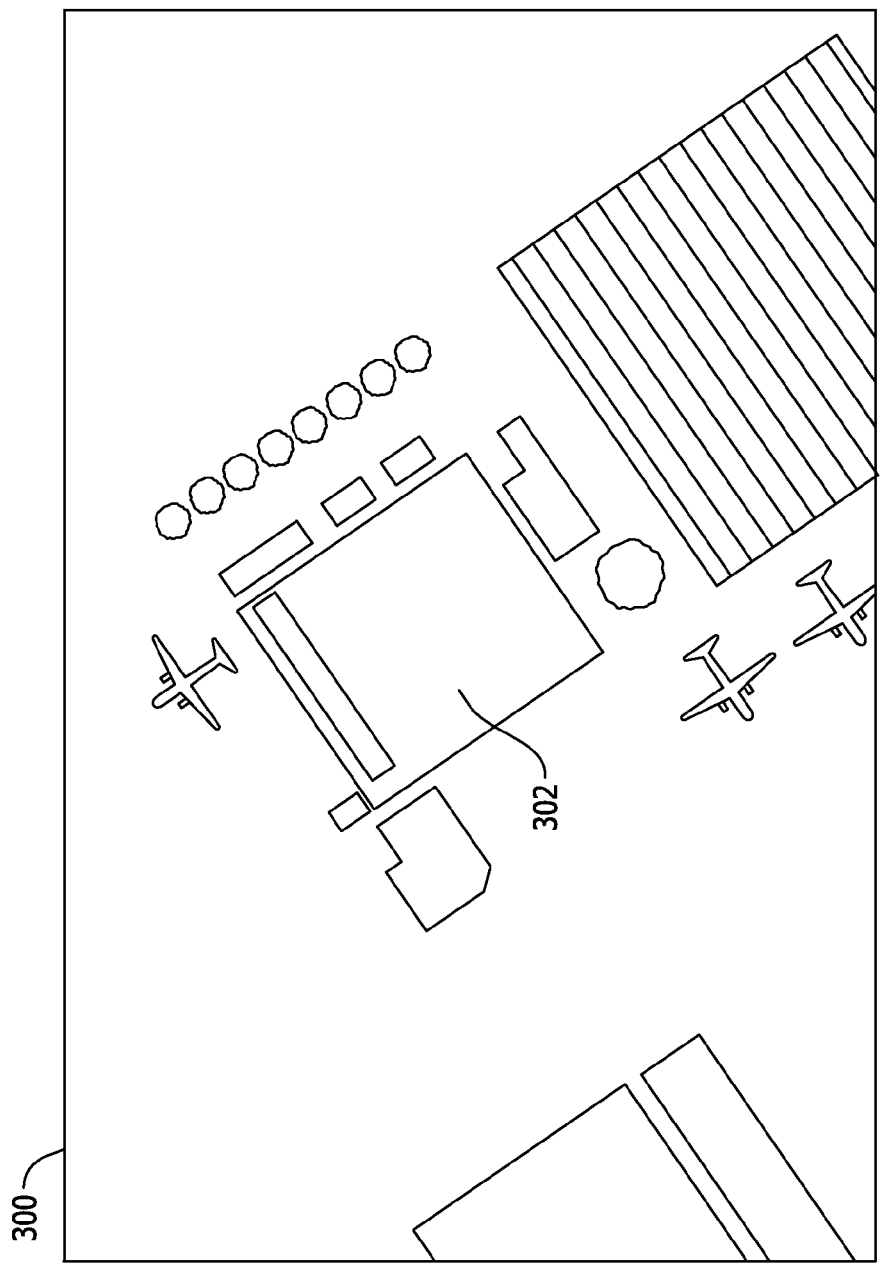
FIG. 3 shows an image analyzed by the boundary determination computing device of FIG. 1.

FIG. 3 shows an image 300 to be analyzed by boundary determination computing device 102. More specifically, in at least some implementations, boundary determination computing device 102 receives image 300 as image data 104, for example as an image file. In at least some implementations, image 300 is a relatively low contrast image, meaning that the boundary of a feature 302 (e.g., object) is difficult to identify with first-order principle means. In image 300, feature 302 is the top of a building.

Figure 4:
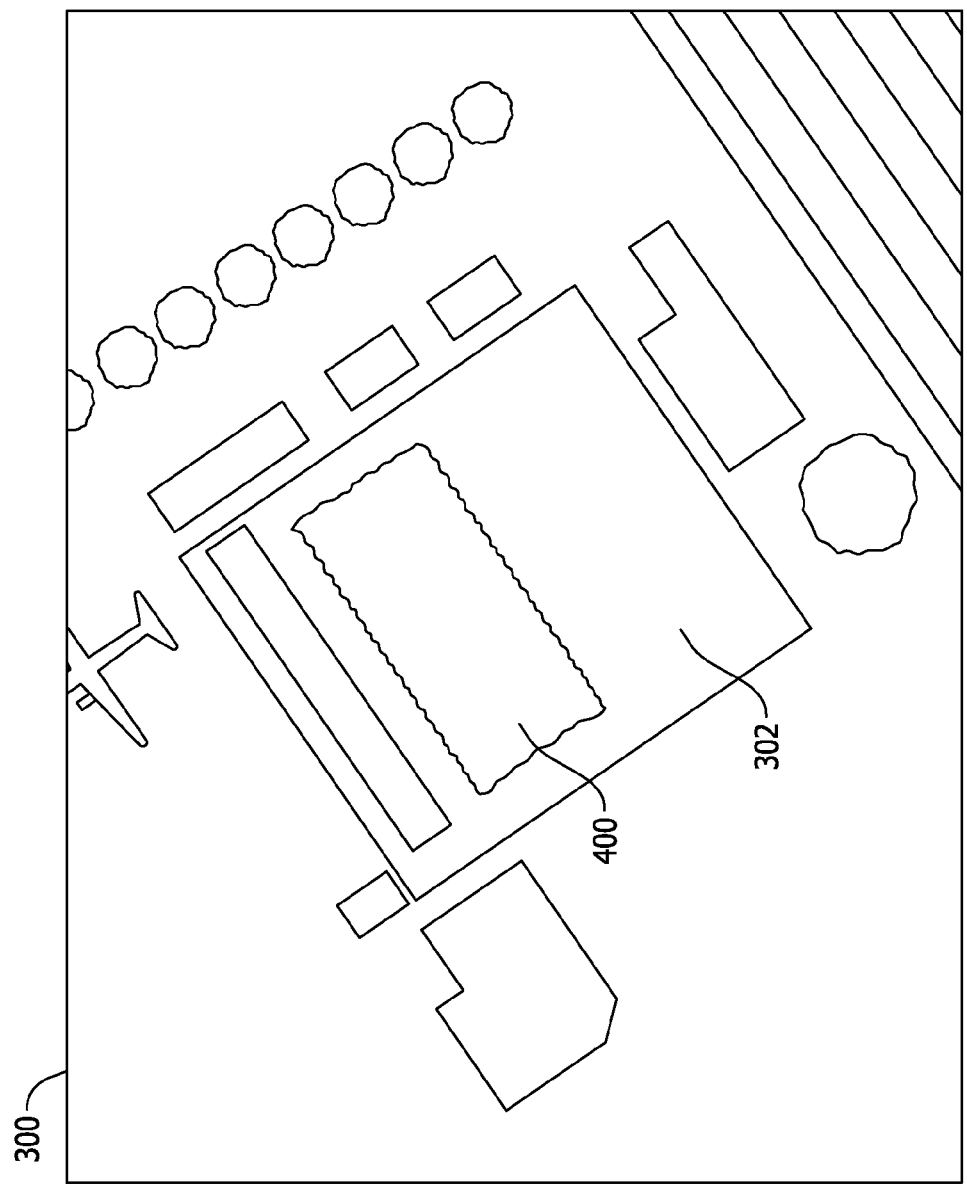
FIG. 4 shows a selection of a region within the image of FIG. 3.

FIG. 4 shows a selection 400 of a region within image 300. More specifically, in at least some implementations, user 201 inputs selection 400, for example using a mouse or stylus, by "drawing" selection 400 on top of image 300. In other implementations, boundary determination computing device 102 receives selection 400 from another input, such as a file that specifies coordinates of selection 400. Selection 400 represents a region that seems, in the user's opinion, to best characterize the primary spectral content (e.g., colors) within the feature 302. In this example, the primary spectral content is represented by the color of the top of the building (e.g., feature 302).

Figure 5:
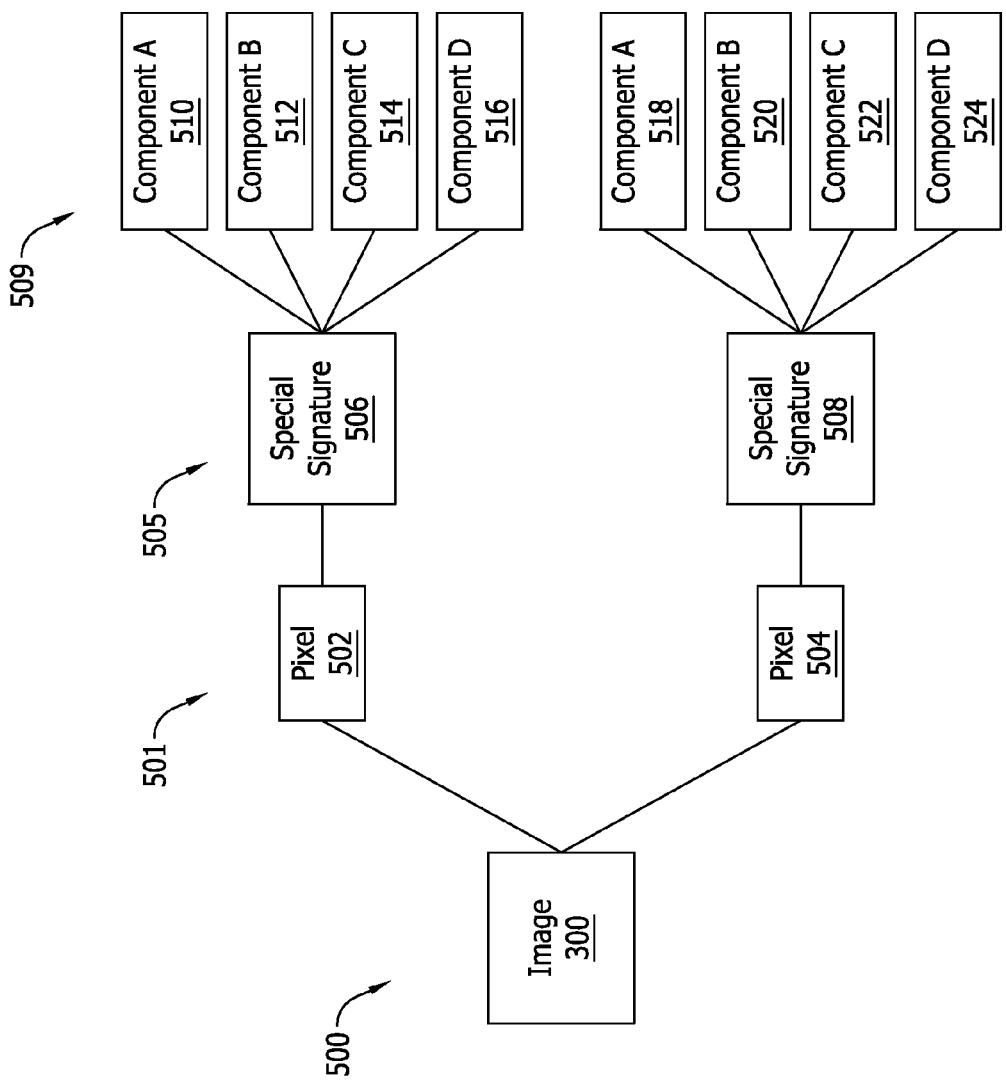
FIG. 5 is a diagram of a relationship of pixels and associated spectral signatures in the image of FIG. 3.

FIG. 5 is a diagram of a relationship 500 of pixels 501 and associated spectral signatures 505 in image 300. As those skilled in the art of image processing will appreciate, an image (e.g., image 300) includes a plurality of pixels (e.g., pixels 500). A first pixel 502, for example, has an associated spectral signature 506. The spectral signature 506 includes components 509 or spectral channels. For example, spectral signature 506 includes a component A 510, a component B 512, a component C 514, and a component D 516. Component A 510 represents, for example, a red intensity, component B 512 represents, for example, a green intensity, component C 514 represents, for example, a blue intensity, and component D 516 represents, for example, an infrared intensity. Likewise, a second pixel 504 has an associated spectral signature 508 that includes a component A 518, a component B 520, a component C 522, and a component D 524 that represent red, green, blue, and infrared intensities, respectively. While only two pixels 501 are shown in FIG. 5, for simplicity, those skilled in the art will appreciate that image 300 includes more than two pixels. Boundary determination computing device 102 performs principal component analysis on the components 509 (e.g., spectral channels) of pixels 501 of image 300 that are included in selection 400.

Figure 6:
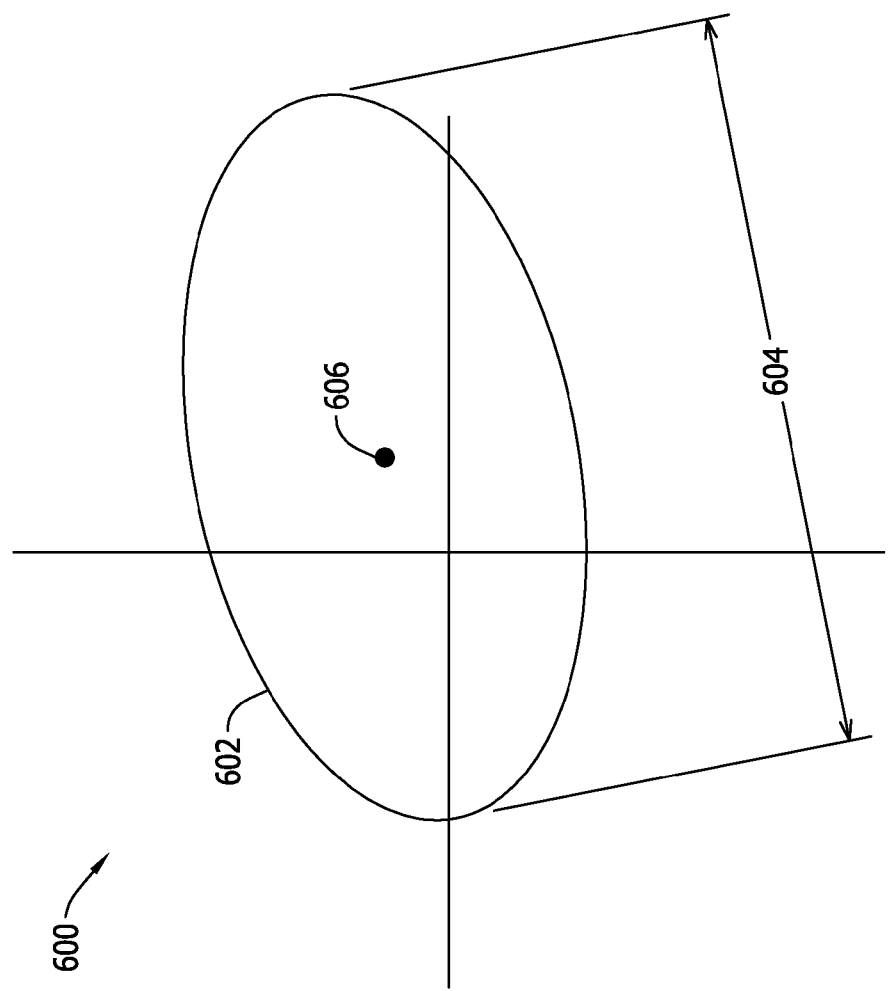
FIG. 6 is a diagram of a principal component analysis performed by the boundary determination computing device of FIG. 1.

FIG. 6 is an illustration of a principal component analysis 600 performed by boundary determination computing device 102. In performing principal component analysis 600, boundary determination computing device 102 determines a plurality of Eigenvectors 1502 (FIG. 15) and Eigenvalues 1504 (FIG. 15) from the spectral signatures 505 and may perform dimension reduction by selecting the Eigenvectors 1502 having larger Eigenvalues 1504 than the other Eigenvectors 1502. After performing the dimension reduction, boundary determination computing device 102 generates an ellipsoid 602 that characterizes the spectral variation 604 in the pixels within the selection 400. Boundary determination computing device 102 additionally determines a centroid 606 representing an average spectral signature of the pixels within the selection 400. Boundary determination computing device 102 determines a boundary for ellipsoid 602, specified as a scale factor of the standard deviation of the principal components (i.e., the Eigenvectors 1502 having the largest Eigenvalues 1504), which captures, for example, 90% of the initial sample pixels (e.g., pixels within selection 400). In other implementations, boundary determination computing device 102 captures a different percentage of initial sample pixels.

In at least some implementations, for example as an option selected by user 201, boundary determination computing device 102 generates more than one ellipsoid. More specifically, in at least some implementations, boundary determination computing device 102 automatically segments pixels 505 within selection 400 using a k-means procedure into two or more spectral clusters and subsequently applies principal component analysis to each cluster. This option will typically show better performance for building features exhibiting shadowing on the roof, uneven illumination, and/or inhomogeneous regions containing multiple material types.

Figure 7:
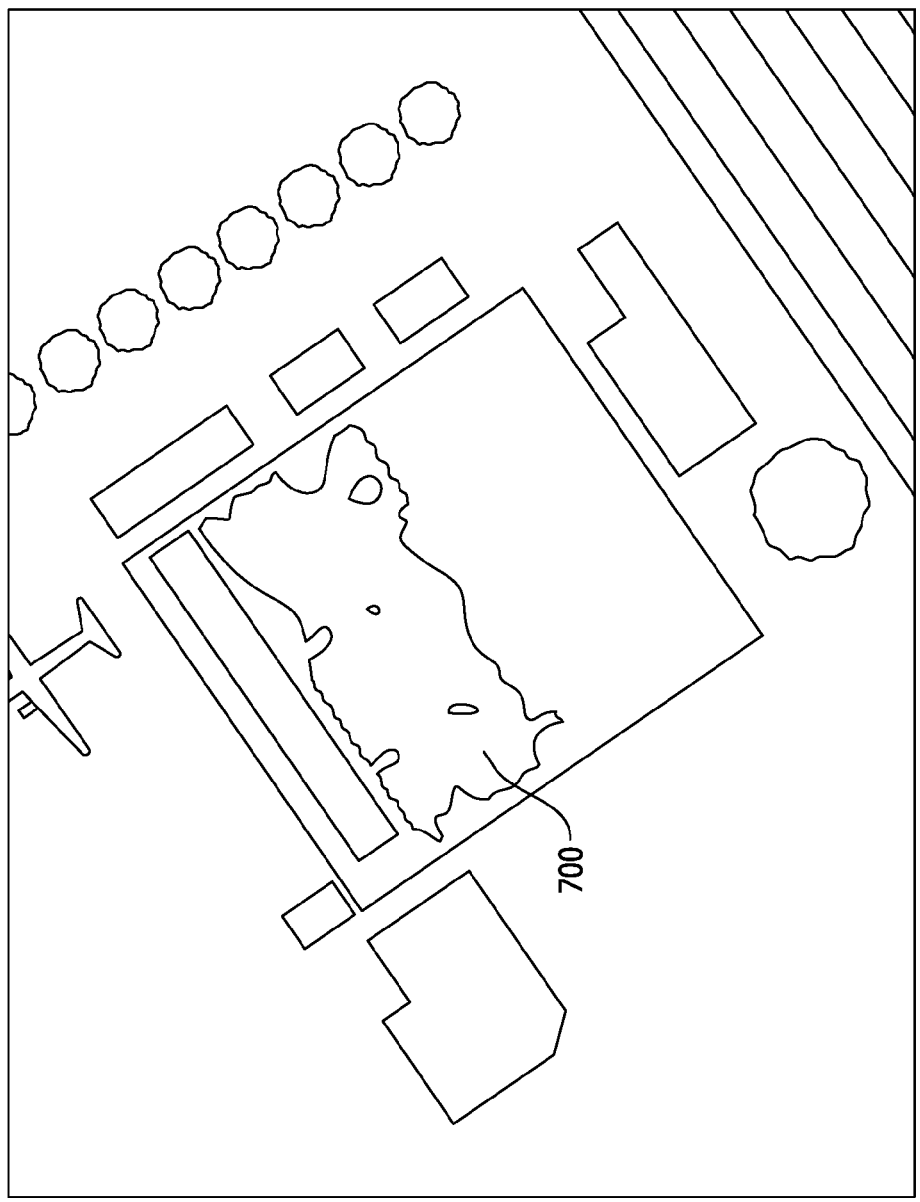
FIG. 7 is a diagram of a dilated boundary generated by the boundary determination computing device of FIG. 1.

FIG. 7 is a diagram of a dilated boundary 700 generated by the boundary determination computing device 102. More specifically, after performing principal component analysis 600, the 90-percentile pixels 501 form an amorphous spatial blob (e.g., dilated boundary 700). Boundary determination computing device 102 dilates blob 700 by extending it outwards by a single pixel. Next, boundary determination computing device 102 retains any new pixels which are also contained within the 90-percentile principal component analysis ellipsoid (e.g., ellipsoid 602). Boundary determination computing device 102 repeats this process of single pixel dilation and retention of only those pixels falling within the principal component analysis ellipsoid 602 until dilation stops. More specifically, the dilation stops when boundary determination computing device 102 no longer identifies new pixels that fall within ellipsoid 602.

Figure 8:
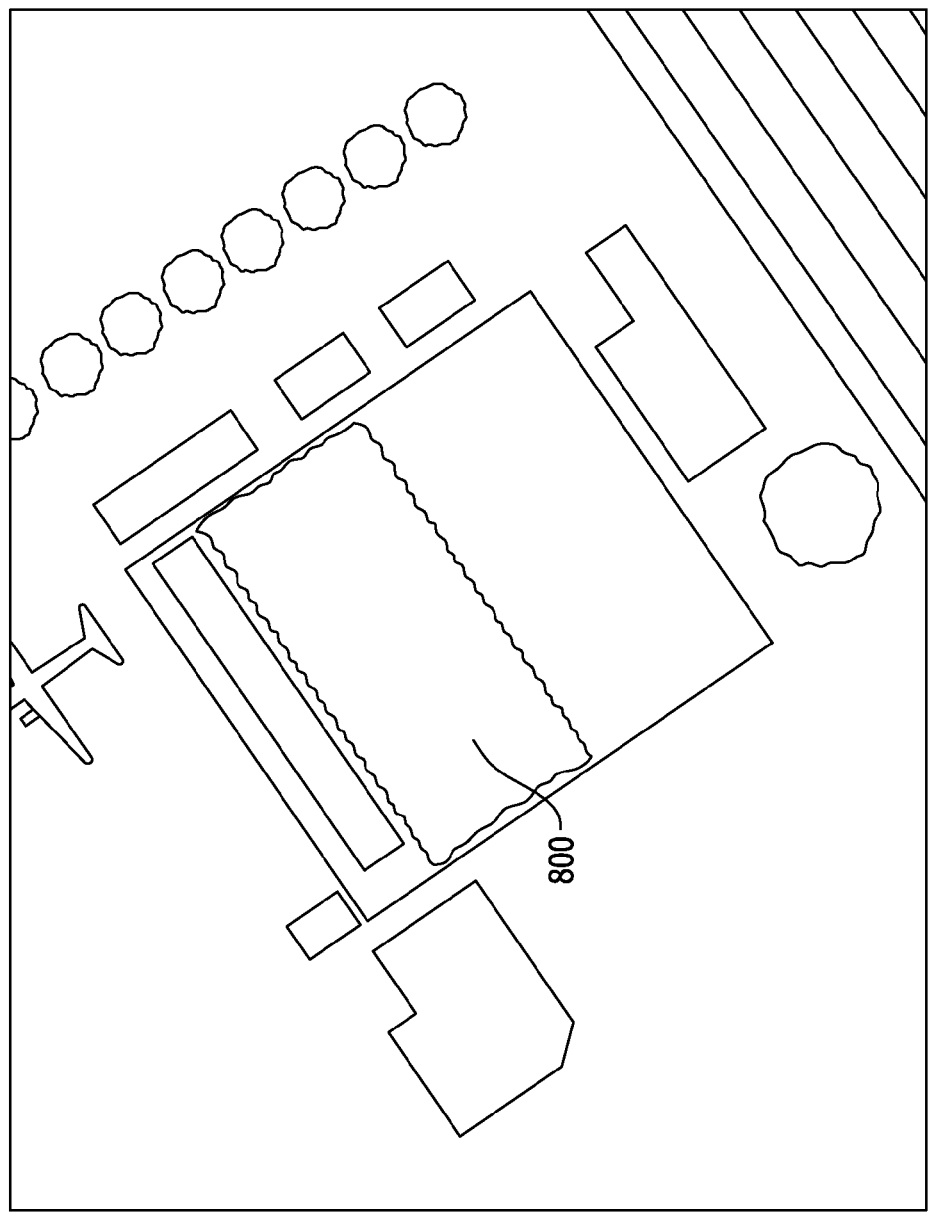
FIG. 8 is a diagram of a boundary generated by the boundary determination computing device of FIG. 1.

FIG. 8 is a diagram of a bounding polygon 800 generated by boundary determination computing device 102. More specifically, boundary determination computing device 102 performs a bounding polygon search and finds an orientation and size (i.e., area) of the smallest polygon (e.g., bounding polygon 800) that contains the pixels 501 within dilated blob 700. Boundary determination computing device 102 determines an initial orientation of the feature 302 based on the orientation of bounding polygon 800 and refines ellipsoid 602 based on pixels 501 of image 300 that are included within bounding polygon 800. The spectral components of every pixel 501 in the image 300 can now be expressed in terms of the principal component analysis Eigenvectors (e.g., Eigenvectors 1502) scaled by the square root of the Eigenvalues (e.g., Eigenvalues 1504). The norm of the converted spectral components forms a "spectral distance" measure from the centroid 606 of the principal component analysis ellipse 602.

Figure 9:
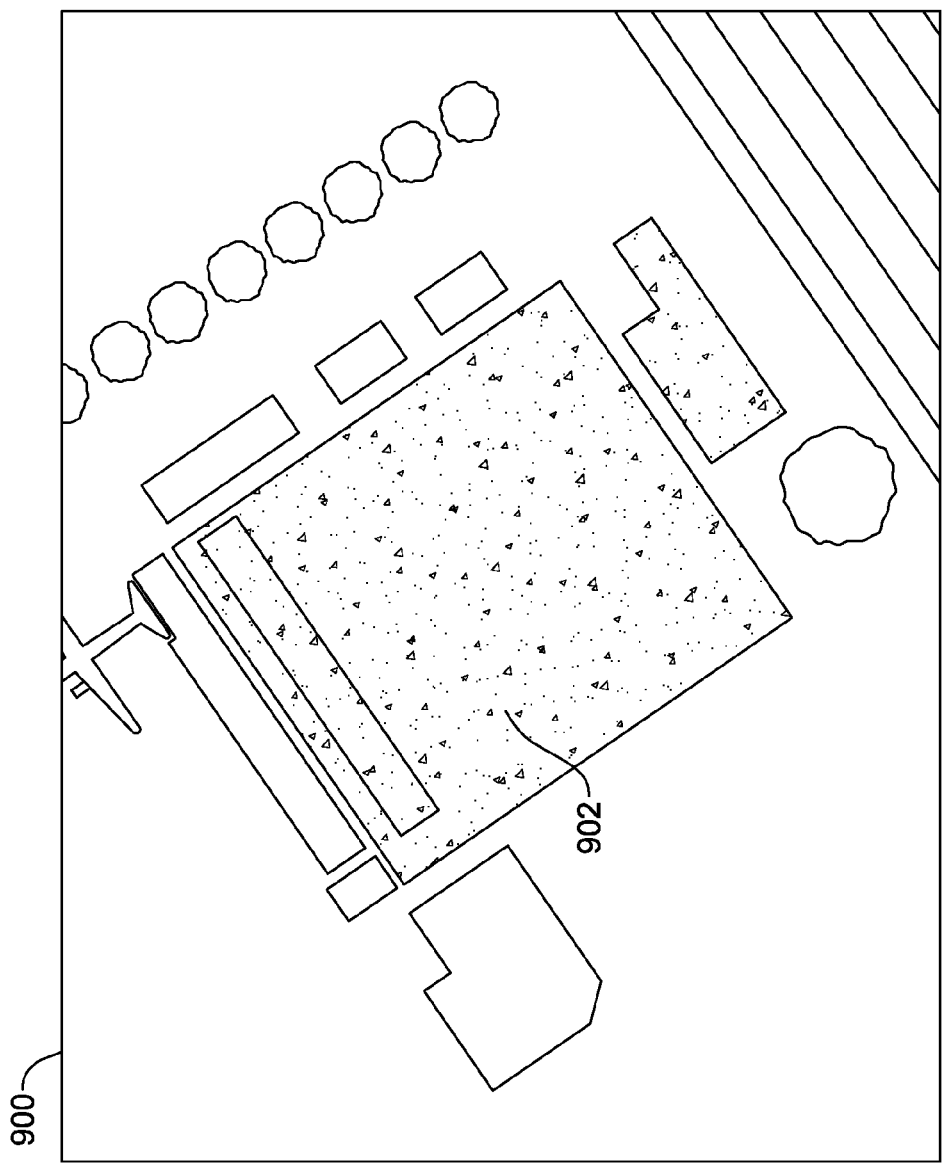
FIG. 9 shows a spectral distance image generated by the boundary determination computing device of FIG. 1.

FIG. 9 shows a spectral distance image 900 generated by boundary determination computing device 102. In spectral distance image 900, darker pixels 902 are spectrally close to those within the bounding polygon 800 (FIG. 8) generated by boundary determination computing device 102. Additionally, boundary determination computing device 102 determines the magnitude of the spectral gradient of the converted pixels, as described below.

Figure 10:
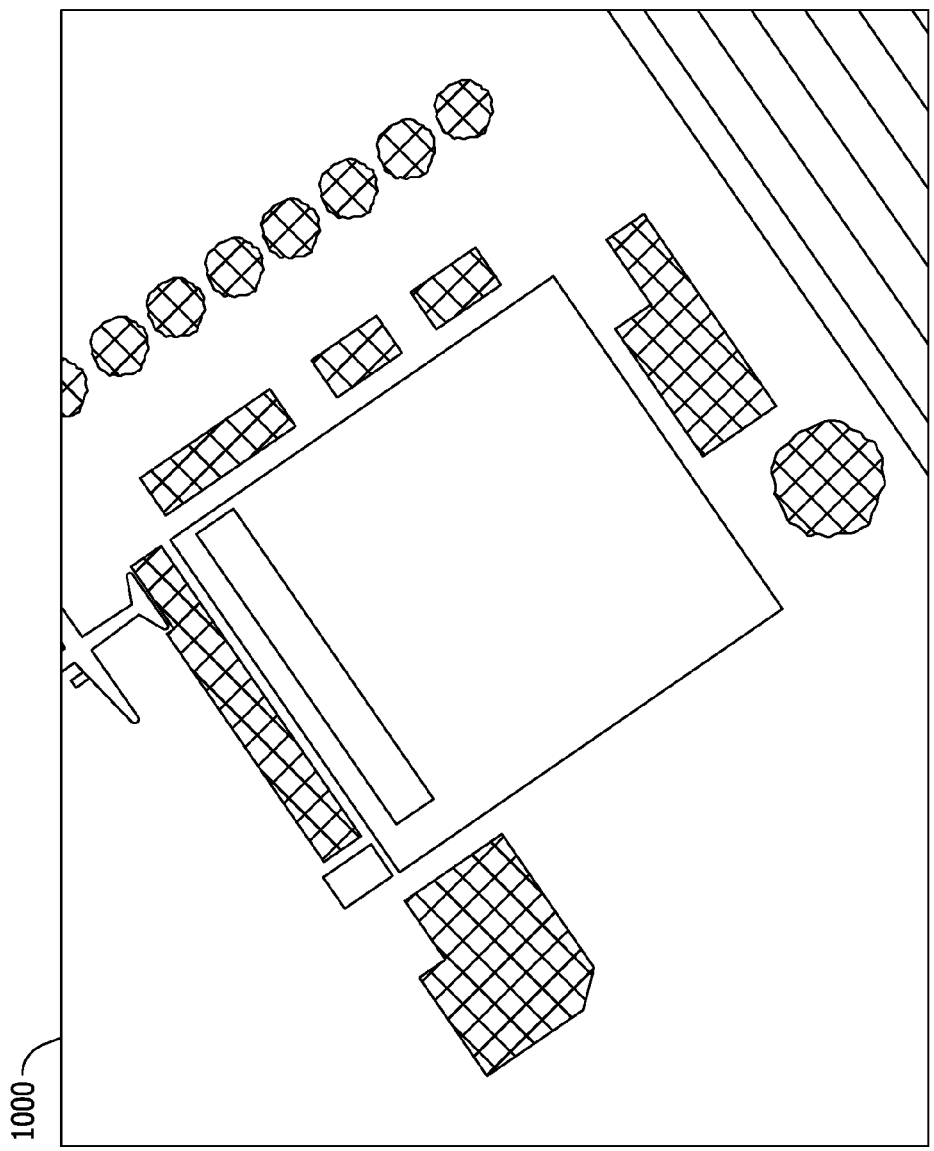
FIG. 10 shows a spectral gradient magnitude image generated by the boundary determination computing device of FIG. 1.

FIG. 10 shows a spectral gradient magnitude image 1000 generated by boundary determination computing device 102. Other forms of edge detection may be used at this step. Boundary determination computing device 102 performs a close operation using two or more line kernels, typically 5 to 7 pixels in length, that are oriented according to bounding polygon 800 to close any gaps that may appear in gradient edges within spectral gradient magnitude image 1000. Orientation of the line kernels would correspond to the edge orientation of the bounding polygon. Next, boundary determination computing device 102 generates a contour image, as described below.

Figure 11:
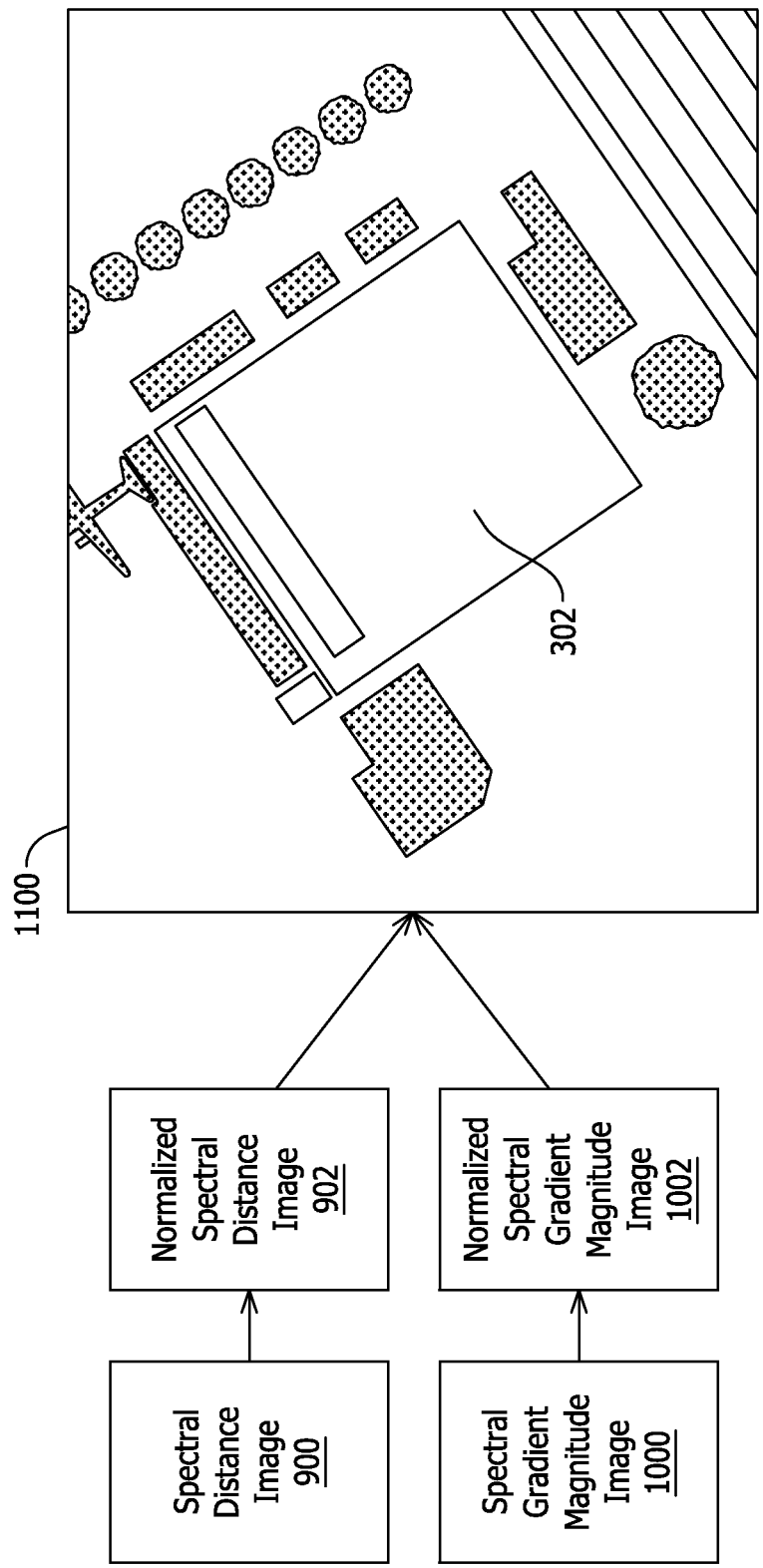
FIG. 11 is a diagram of a contour image generated by the boundary determination computing device of FIG. 1.

FIG. 11 is a diagram of a contour image 1100 generated by boundary determination computing device 102. More specifically, boundary determination computing device 102 normalizes spectral distance image 900, thereby generating normalized spectral distance image 902. Additionally, boundary determination computing device 102 normalizes spectral gradient magnitude image 1000, thereby generating normalized spectral gradient magnitude image 1002. Next, boundary determination computing device 102 adds the normalized spectral distance image 902 with the normalized spectral gradient magnitude image 1002, thereby generating contour image 1100 (i.e., an edge-enhance image). In at least some implementations, boundary determination computing device 102 truncates the upper and lower 10% of the pixels to eliminate strong outliers. In contour image 1100, feature 302 is deep blue (as an example), with distinct boundaries.

Figure 12:
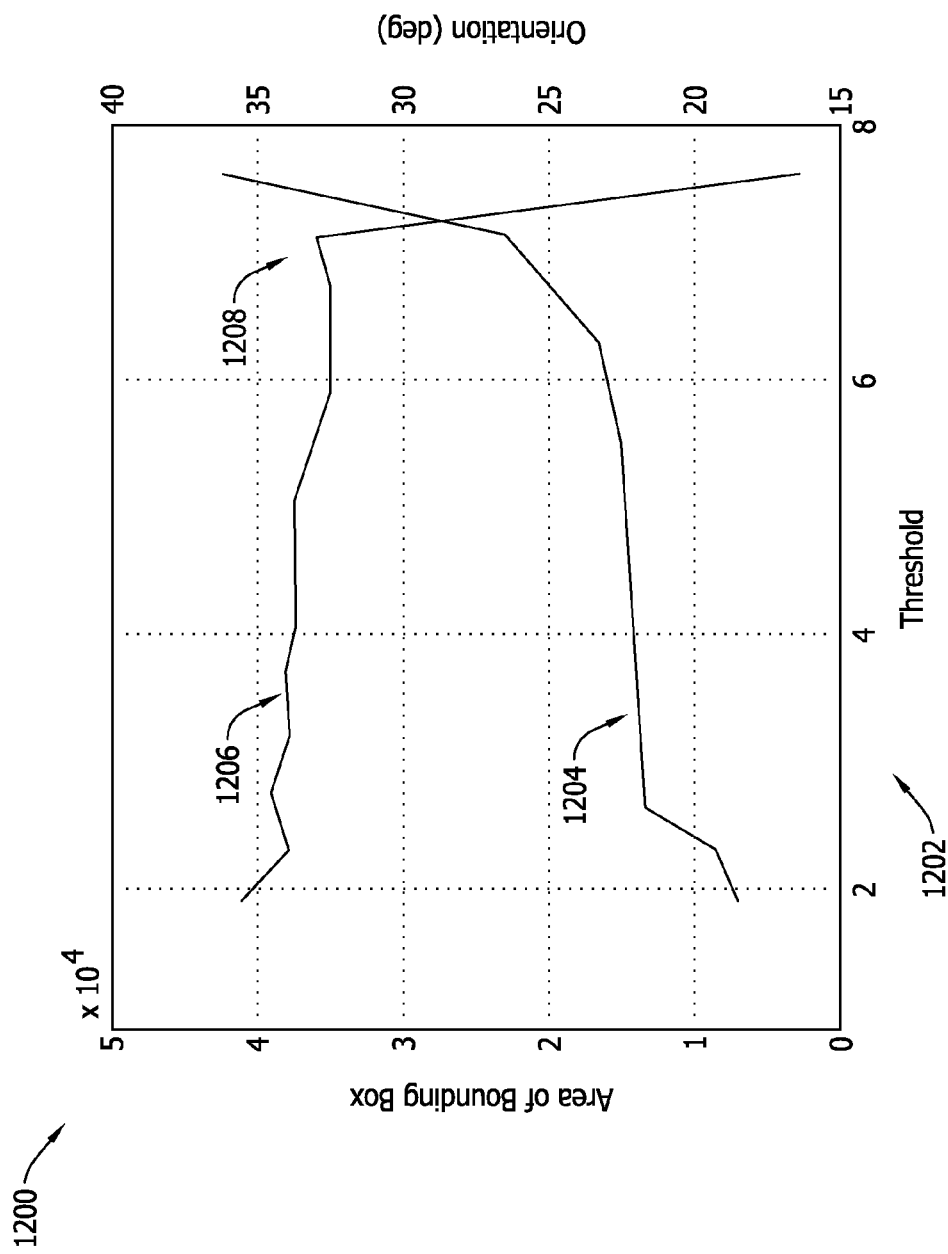
FIG. 12 is a graph of an area and an orientation of the boundary as a threshold for including pixels within the boundary is adjusted.

FIG. 12 is a graph 1200 of an area 1204 and an orientation 1206 of a bounding polygon. More specifically, graph 1200 represents the area of the bounding polygon as a threshold 1202 is adjusted. Threshold 1202 is a pixel value threshold used in determining whether pixels will be included within the bounding polygon. More specifically, after generating contour image 1100, boundary determination computing device 102 performs a process of adjusting threshold 1202 (FIG. 12) to add additional pixels to a bounding polygon similar to bounding polygon 800. The threshold 1202 represents an amount of spectral distance from the average spectral signature (e.g., centroid 606) allowed to be included within a bounding polygon similar to bounding polygon 800. At each increment of threshold 1202, boundary determination computing device 102 adjusts bounding polygon 800 to be the smallest bounding rectangle that includes an amorphous blob of pixels that falls below the threshold 1202. As the threshold 1202 increases, the area 1204 and orientation 1206 of the bounding polygon 800 stabilizes and then abruptly changes, at an inflection point 1208.

Figure 13:
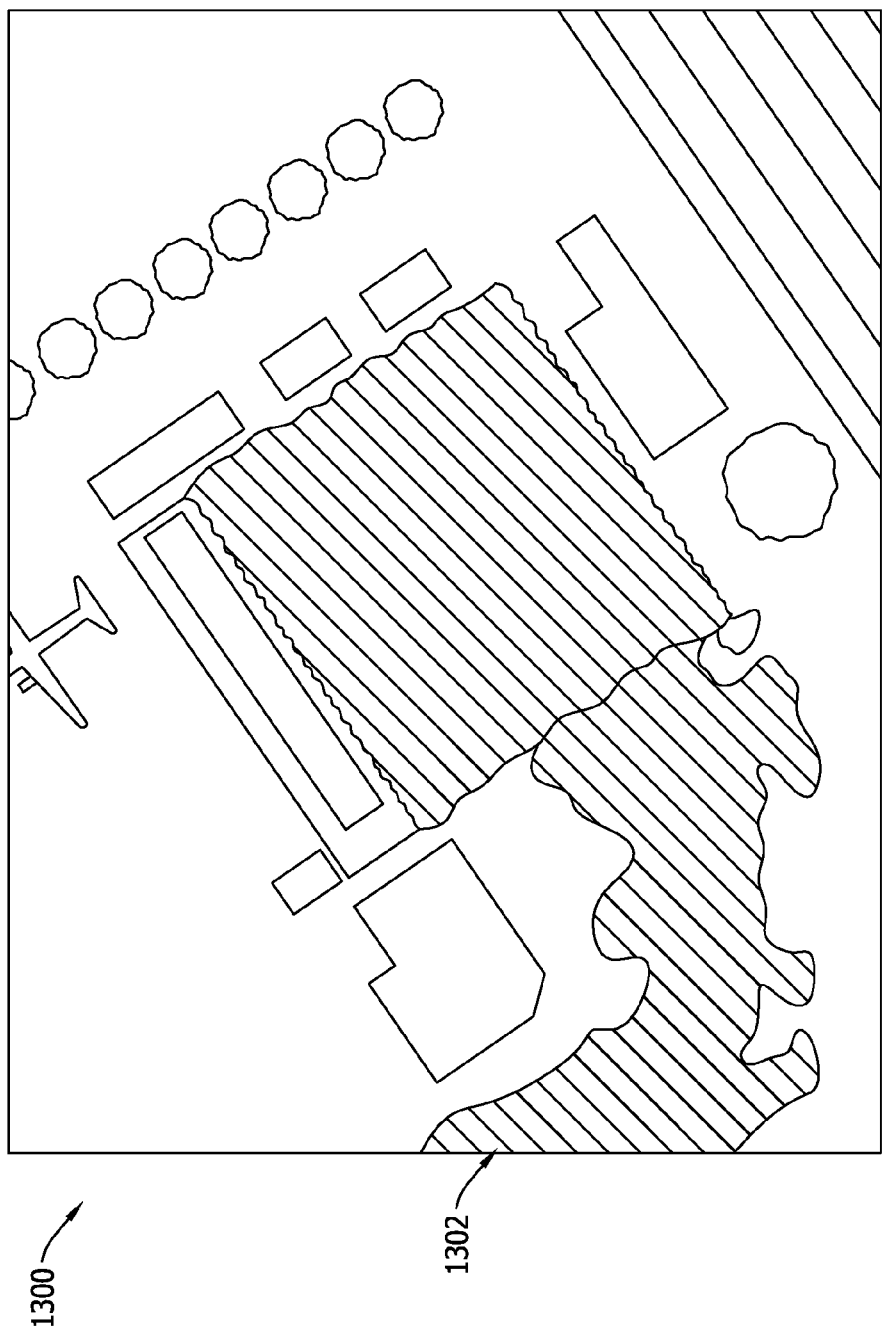
FIG. 13 is a diagram of spillage out of the boundary when the threshold has exceeded an inflection point.
Figure 14:
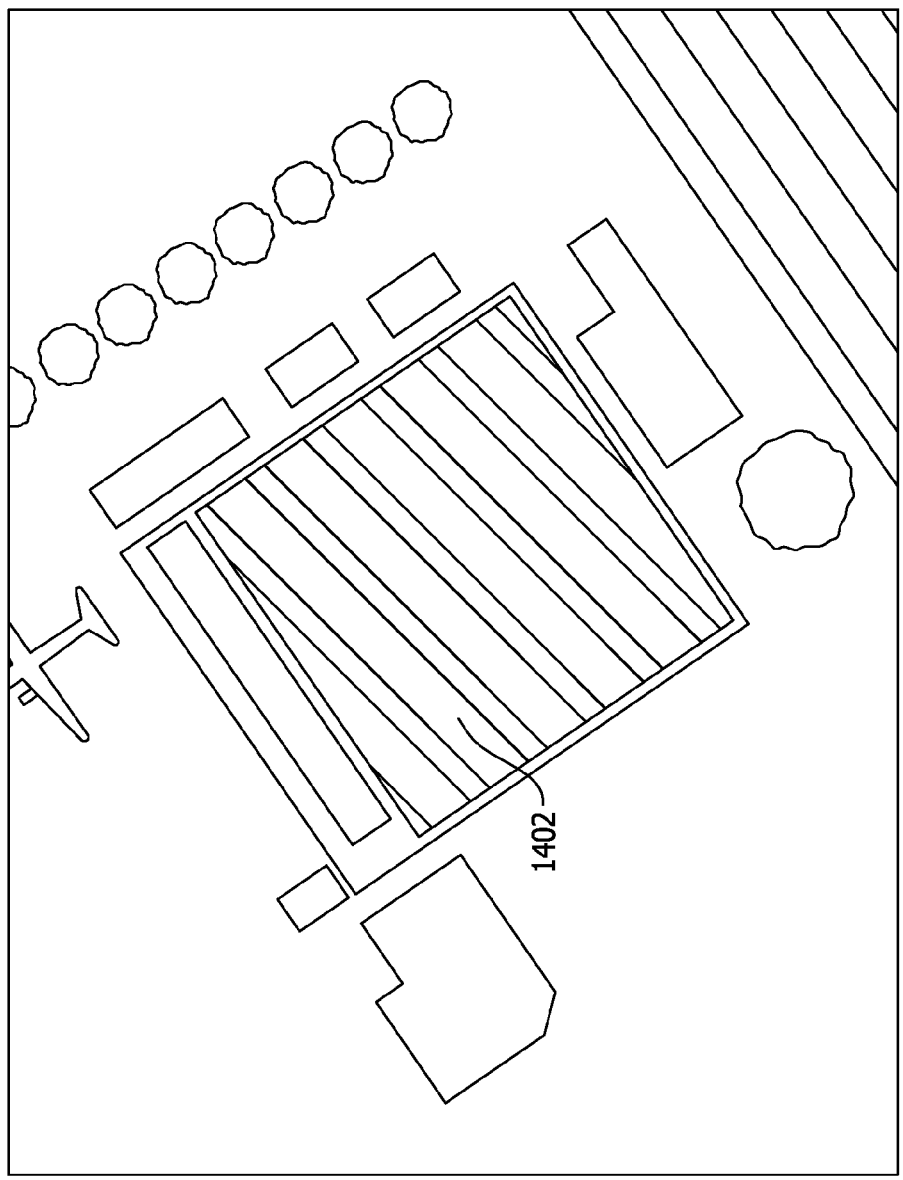
FIG. 14 is a diagram of a boundary rectangle that includes pixels that fall below the threshold at the inflection point.

FIG. 13 is a diagram of "spillage" out of the bounding polygon 800 when the threshold 1202 has exceeded inflection point 1208. Presented with graph 1200, user 201 could select a final threshold value anywhere between 6 and 7.5. A more conservative (i.e., slightly lower) threshold (e.g., 6) will typically work best. FIG. 14 is a diagram of a bounding polygon 1400 (e.g., a rectangle) that includes pixels that fall below the final threshold selected by user 201. In at least some implementations, boundary determination computing device 102 stores bounding polygon 1400, for example as a set of coordinates, in memory 210, transmits the coordinates to another computing device (not shown), and/or otherwise outputs a representation of bounding polygon 1400.

Figure 15:
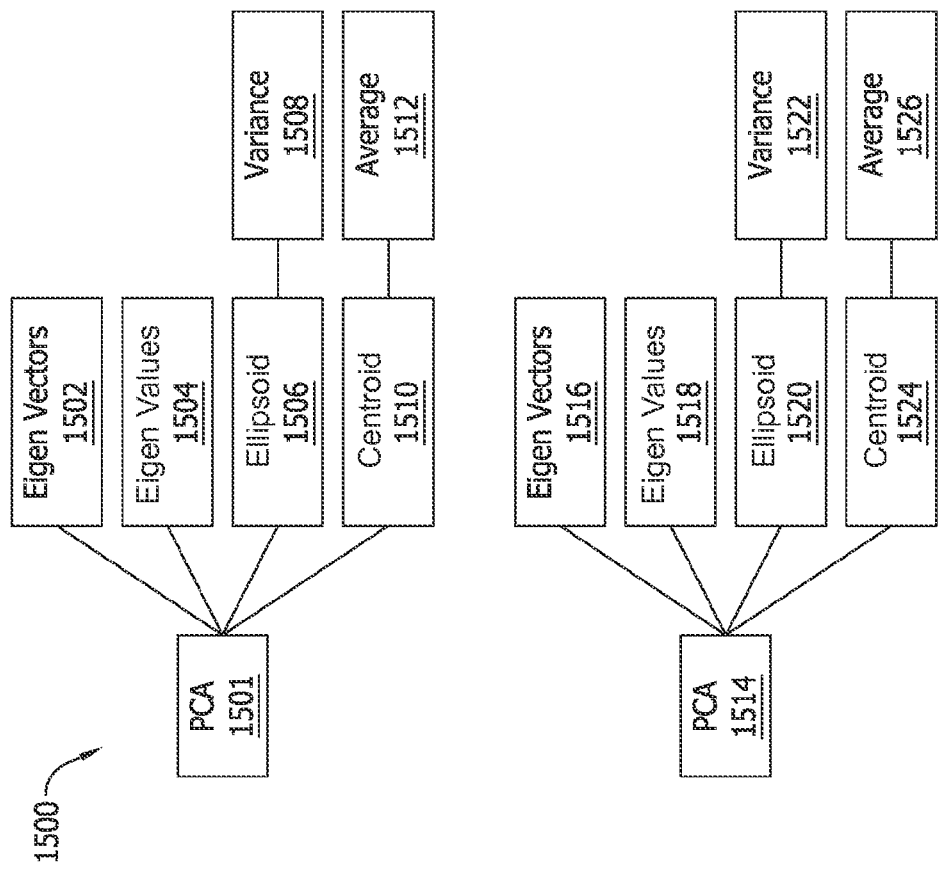
FIG. 15 is a diagram of results of multiple principal component analyses performed by the boundary determination computing device of FIG. 1.

As described above, in at least some implementations, boundary determination computing device 102 performs multiple principal component analyses, for example as a user-selected option. FIG. 15 is a diagram 1500 of results of multiple principal component analyses performed by boundary determination computing device 102. Boundary determination computing device 102 performs a first principal component analysis 1501 for a first cluster of pixels 501. More specifically, boundary determination computing device 102 generates first Eigenvectors 1502, first Eigenvalues 1504, a first ellipsoid 1506 representing a variance 1508 in spectral signatures, and a centroid 1510 representing an average spectral signature 1512. Boundary determination computing device 102 performs a second principal component analysis 1514, for example for a second cluster of pixels 501, thereby generating second Eigenvectors 1516, second Eigenvalues 1518, a second ellipsoid 1520 representing a second variance 1522 in spectral signatures, and a second centroid 1524 representing a second average spectral signature 1526. When a feature (e.g., feature 302) is characterized as composed of, for example, two distinct spectral signatures, the mathematics of spectral distance and spectral gradient must be appropriately extended to 2n dimensions. It is possible to formulate a given pixel's distance from the center (e.g., centroid 1510) of a single ellipsoid (e.g., ellipsoid 1506). Once every image pixel is expressed in terms of n principal components (e.g., Eigenvectors 1502), the distance of any given pixel from the ellipsoid 1506 is as shown in Equation 1:

$$R = \sqrt{\sum_{i=1}^{n}\left(\frac{x_i - \bar{x}_i}{\sigma_i}\right)^2} \quad \text{(Equation 1)}$$

In Equation 1, $x_i$ is the value of the pixel along the i-th principal component (Eigenvector), $\bar{x}_i$ is the i-th component of the centroid (e.g., centroid 1510) of the ellipsoid (e.g., ellipsoid 1506), and $\sigma_i$ is the square root of the i-th Eigenvalue. When there are two ellipsoids (e.g., ellipsoid 1506 and ellipsoid 1520), the distance is computed as though there were 2n principal components, as shown in Equation 2:

$$R = \sqrt{\sum_{i=1}^{2n}\left(\frac{x_i - \bar{x}_i}{\sigma_i}\right)^2} \quad \text{(Equation 2)}$$

In at least some implementations, for computational purposes, the two ellipsoids are essentially treated as one ellipsoid with double the number of components. In other words, the spectral dimensionality is doubled. All subsequent computations, including the magnitude of the spectral gradient, are treated as though the image pixels now have double the number of spectral components. This extension process implicitly assumes that the added spectral components are real and independent of the original set. Physically this is not the case, as it is meaningful to express the "new" components in terms of the original basis set. Nevertheless, the above mathematical treatment improves the performance of more accurate characterization of the spectral content of the feature by the boundary determination computing device 102.

Figure 16:
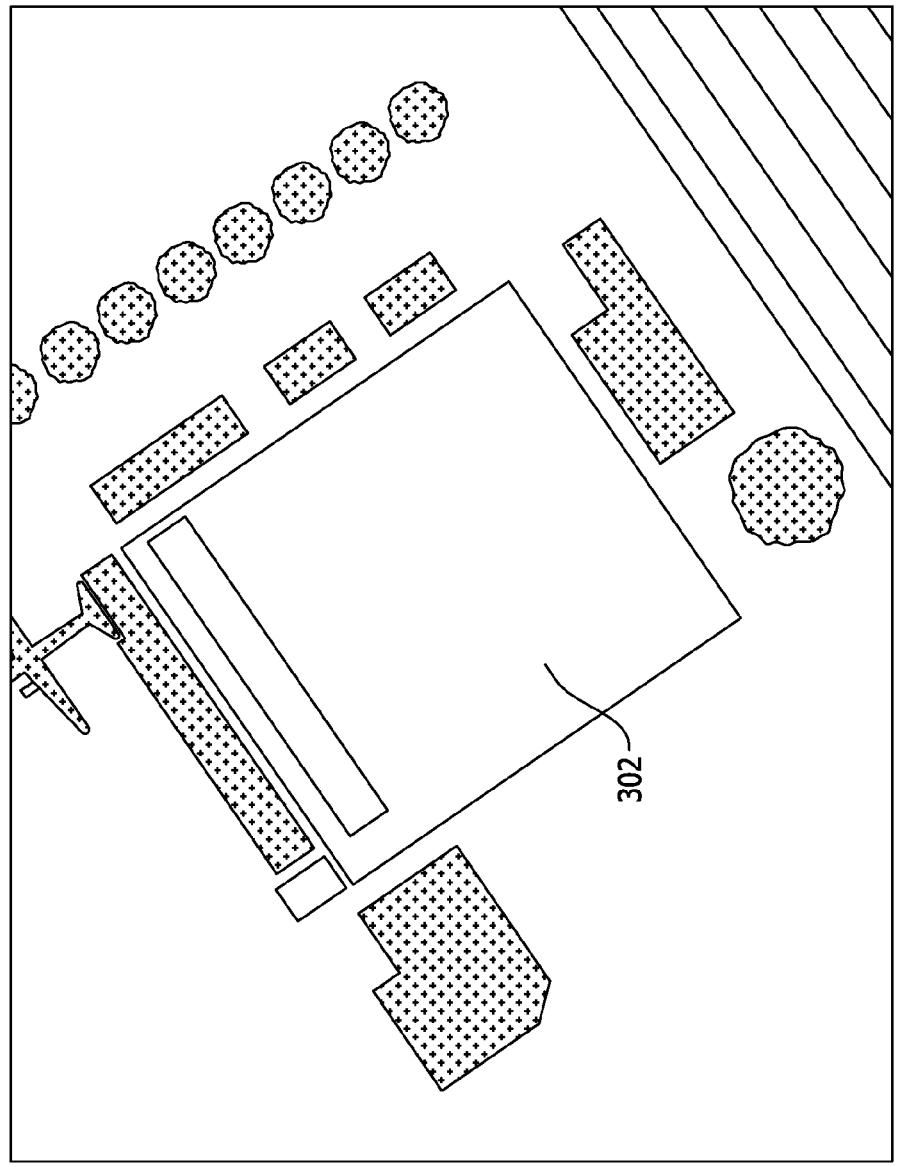
FIG. 16 is a diagram of a false color image analyzed by the boundary determination computing device of FIG. 1.

In some implementations, boundary determination computing device 102 adjusts the position of the edges or sides of bounding polygon 1400 by performing a propagating edge process or a vertex repositioning process, both of which are described herein. FIG. 16 is a diagram of a false color image 1600 analyzed by boundary determination computing device 102. In at least some implementations, false color image 1600 is contour image 1100, described above. Image 1600 reveals a roughly four sided feature (e.g., feature 302). The process described herein refines the position of the edges or sides of a bounding polygon that defines feature 302.

Figure 17:
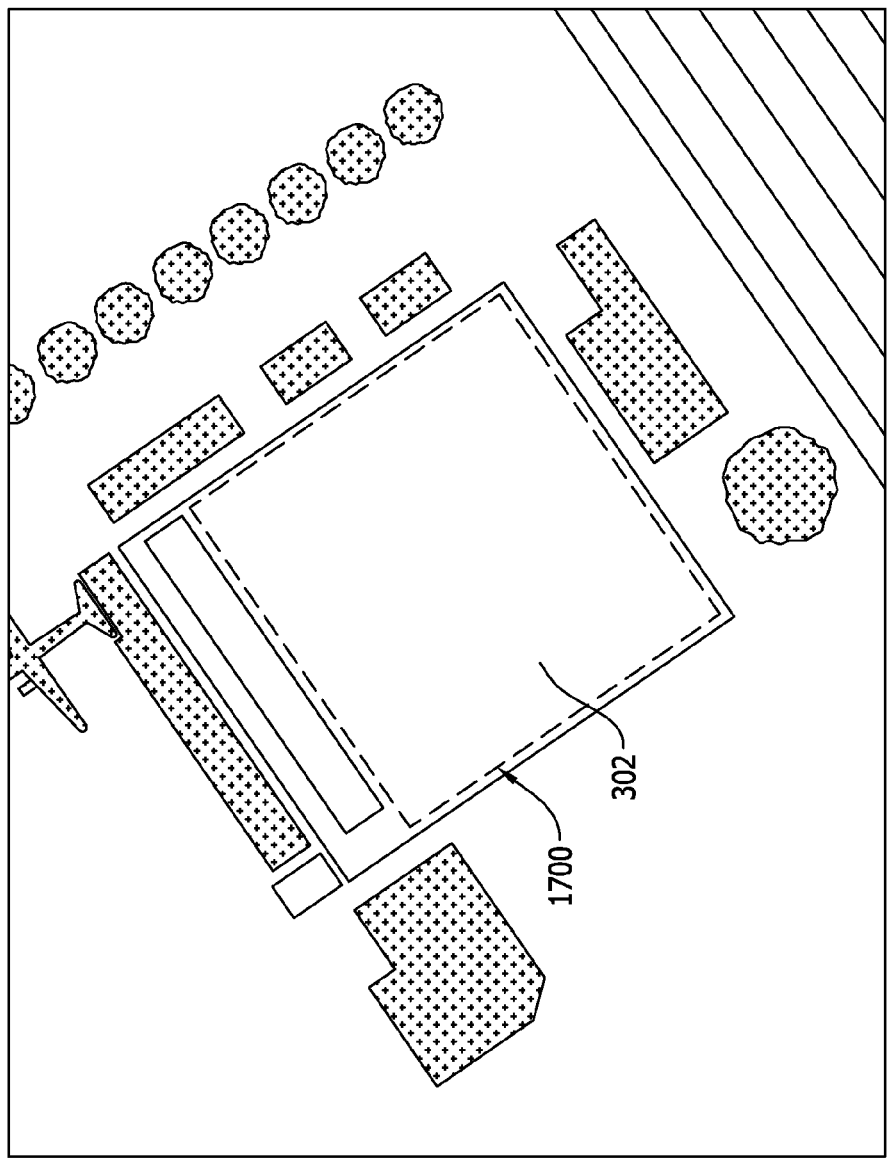
FIG. 17 is a diagram of a bounding rectangle within the false color image of FIG. 16.

FIG. 17 is a diagram of a bounding polygon (or in this specific example, a rectangle) 1700 within the false color image 1600. More specifically, boundary determination computing device 102 determines initial bounding polygon 1700 by finding a bounding rectangle that contains as much of the dark pixels (being determined by a spectral proximity threshold, such as threshold 1202) as possible (i.e., without causing the spillage 1302 described above with reference to FIG. 13). Since real features in an image do not always have perfectly straight or well defined edges, boundary determination computing device 102 refines the initial bounding rectangle 1700 by independently repositioning each edge of bounding rectangle 1700 to better define feature 302.

Figure 18:
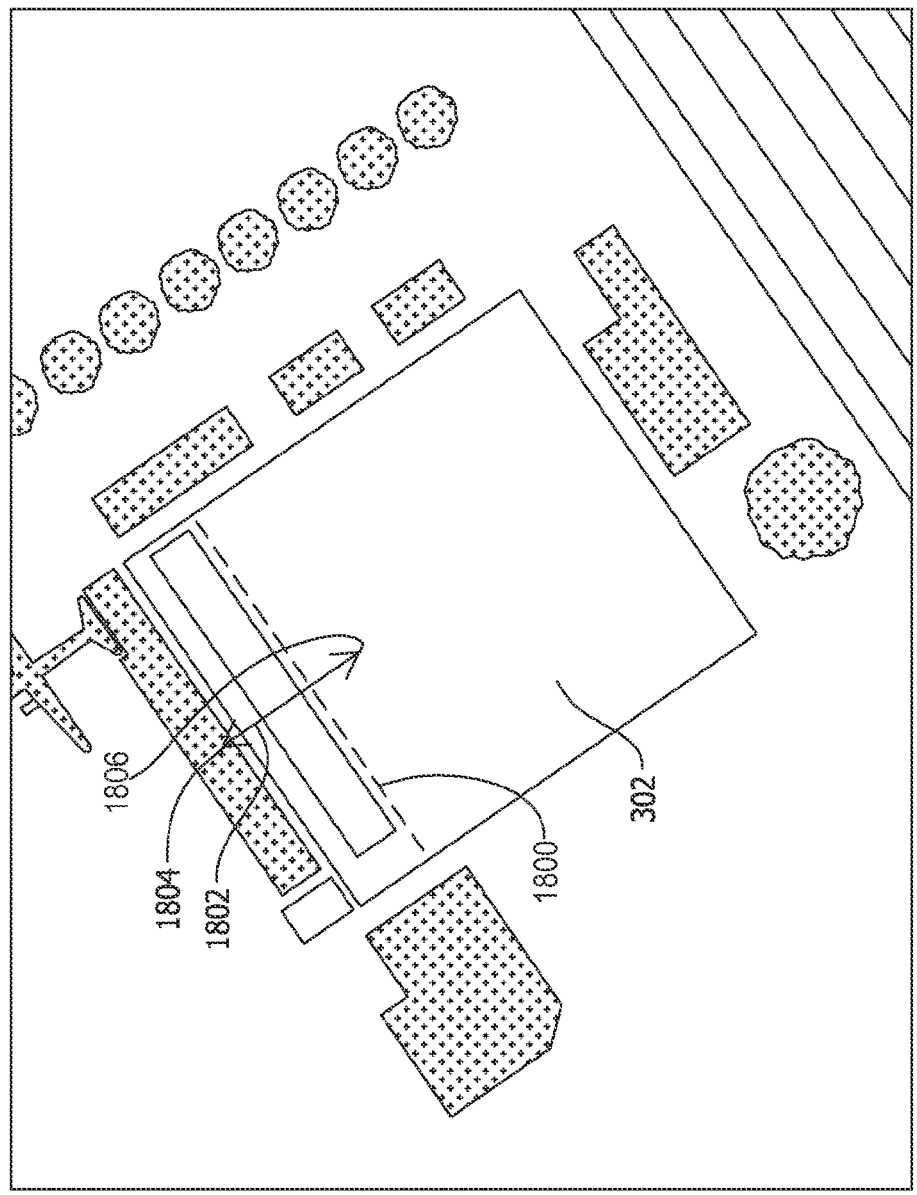
FIG. 18 is a diagram of an edge that is translated along an axis perpendicular to the edge by the boundary determination computing device of FIG. 1.

FIG. 18 is a diagram of an edge 1800 that is translated ("swept") along an axis 1802 perpendicular to the edge 1800 by boundary determination computing device 102. As boundary determination computing device 102 translates edge 1800 forwards (e.g., first direction 1804) and backwards (e.g., second direction 1806) from its initial position, edge 1800 moves into and out of the body of feature 302. Boundary determination computing device 102 calculates a median of the pixel values along the translating edge 1800 for each incremental movement. The incremental movements are relative to the initial position and are indicated as forward and backward steps.

Figure 19:
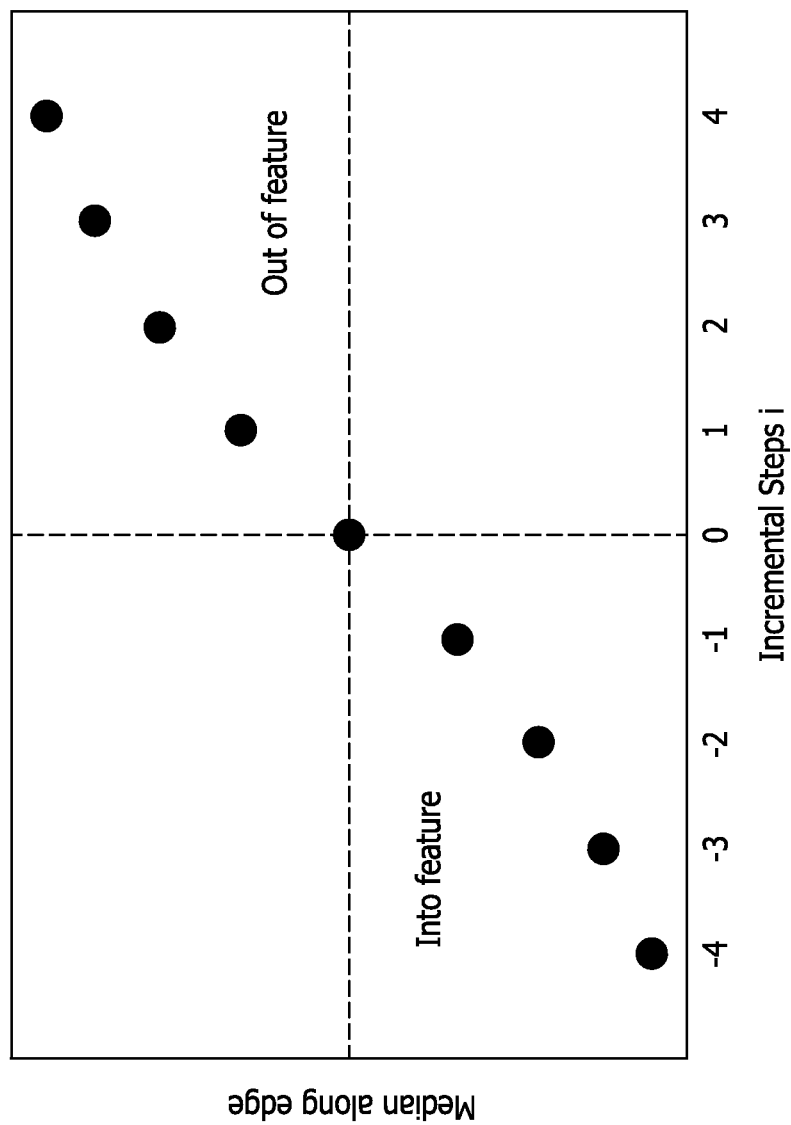
FIG. 19 is a graph of median pixel values as the edge is translated along the axis perpendicular to the edge.

FIG. 19 is a graph 1900 of median pixel values as the edge 1800 is translated along the axis 1802 perpendicular to the edge 1800. The median value at the initial position is the origin value $M_0$. Boundary determination computing device 102 calculates median values for all positions relative to the starting median, and normalizes them by the standard deviation of all the median values, as shown by Equation 3:

$$V_i = (M_i - M_0)/STD(M) \qquad \text{(Equation 3)}$$

Boundary determination computing device 102 calculates the mean value of V for the negative side and positive sides to give $\bar{V}_+$ and $\bar{V}_-$. Next, boundary determination computing device 102 calculates a measure of asymmetry, as shown by Equation 4:

$$A = \bar{V}_+ + \bar{V}_- \qquad \text{(Equation 4)}$$

A negative asymmetry means the edge 1800 would be better placed by shifting it one increment to the negative side (e.g., second direction 1806). A positive asymmetry means the edge would be better placed by shifting it one increment to the positive side (e.g., first direction 1804). However, boundary determination computing device 102 does not actually perform the shift until boundary determination computing device 102 calculates the asymmetry values for every edge and compares the asymmetry values to one another. This comparison is the reason for the normalization step in Equation 3. Boundary determination computing device 102 selects the edge motion with the largest absolute asymmetry value for an incremental shift in position. Boundary determination computing device 102 carries out this shift and obtains a new provisional definition of the feature 302. Boundary determination computing device 102 repeats this process, identifying the "worst" of the edges of bounding rectangle 1700 (i.e., the edge motion with the largest absolute asymmetry value), and selects the "worst" edge for an incremental adjustment. Different boundary rectangle options eventually become stable, toggling between two or three configurations. Boundary determination computing device 102 selects the configuration with the smallest maximum asymmetry value and stops the process.

In some implementations, boundary determination computing device 102 adjusts the positioning of one or more vertices of bounding rectangle 1700. More specifically, since real features in an image do not always have perfectly parallel sides, boundary determination computing device 102, in at least some implementations, refines bounding rectangle 1700 by independently repositioning each vertex to better define the feature 302.

Figure 20:
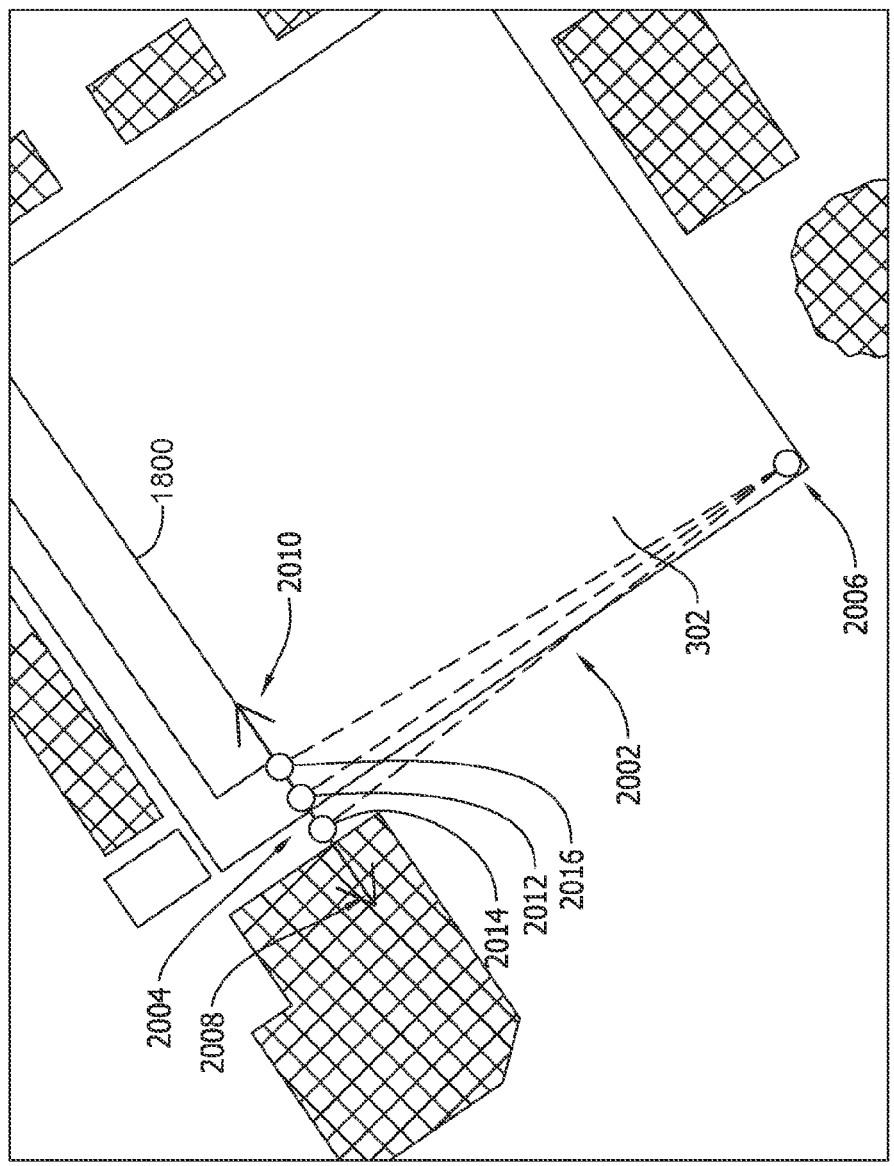
FIG. 20 is a diagram of a vertex of a first edge of a boundary at different positions.

FIG. 20 is a diagram of a vertex 2004 of an edge 2002 of a boundary (e.g., bounding rectangle 1700) at different positions, including an initial position 2012, a second position 2014, and a third position 2016. More specifically, edge 2002 includes a first vertex 2004 and a second vertex 2006. Boundary determination computing device 102 moves vertex 2004 in a first direction 2008 and a second direction 2010 that is opposite the first direction 2008 and collinear with edge 1800. As boundary determination computing device 102 sweeps vertex 2004 along directions 2008 and 2010, edge 2002 rotates into and out of the body of feature 302. Boundary determination computing device 102 calculates the median of the pixel values along rotating edge 2002 for each incremental movement of vertex 2004. Incremental movements are relative to the initial position 2012 and are indicated as forward (e.g., first direction 2008) and backward movements (e.g., second direction 2010). Boundary determination computing device 102 adjusts the positioning of each vertex in boundary rectangle 1700 using Equations 3 and 4 described above. A negative asymmetry means a vertex would be better placed by shifting it one increment to the negative side (e.g., second direction 2010). A positive asymmetry means a vertex would be better placed by shifting it one increment to the positive side (e.g., first direction 2008). The shift is not carried out until boundary determination computing device 102 calculates and compares the asymmetry values for each vertex (two A values for each vertex). This comparison is the reason for the normalization step in Equation 3. Boundary determination computing device 102 selects the vertex motion (one of eight in all) with the largest absolute asymmetry value for an incremental shift in position. Boundary determination computing device 102 carries out the shift and obtains a new provisional definition of the feature 302. Boundary determination computing device repeats the above-described process, always identifying one of eight possible adjustments (in one embodiment), which is then carried out by the boundary determination computing device 102. Four-sided polygon configurations eventually become stable, toggling between two or three configurations. Boundary determination computing device 102 selects the configuration having the smallest maximum asymmetry as the final configuration for the boundary of feature 302.

Figure 21:
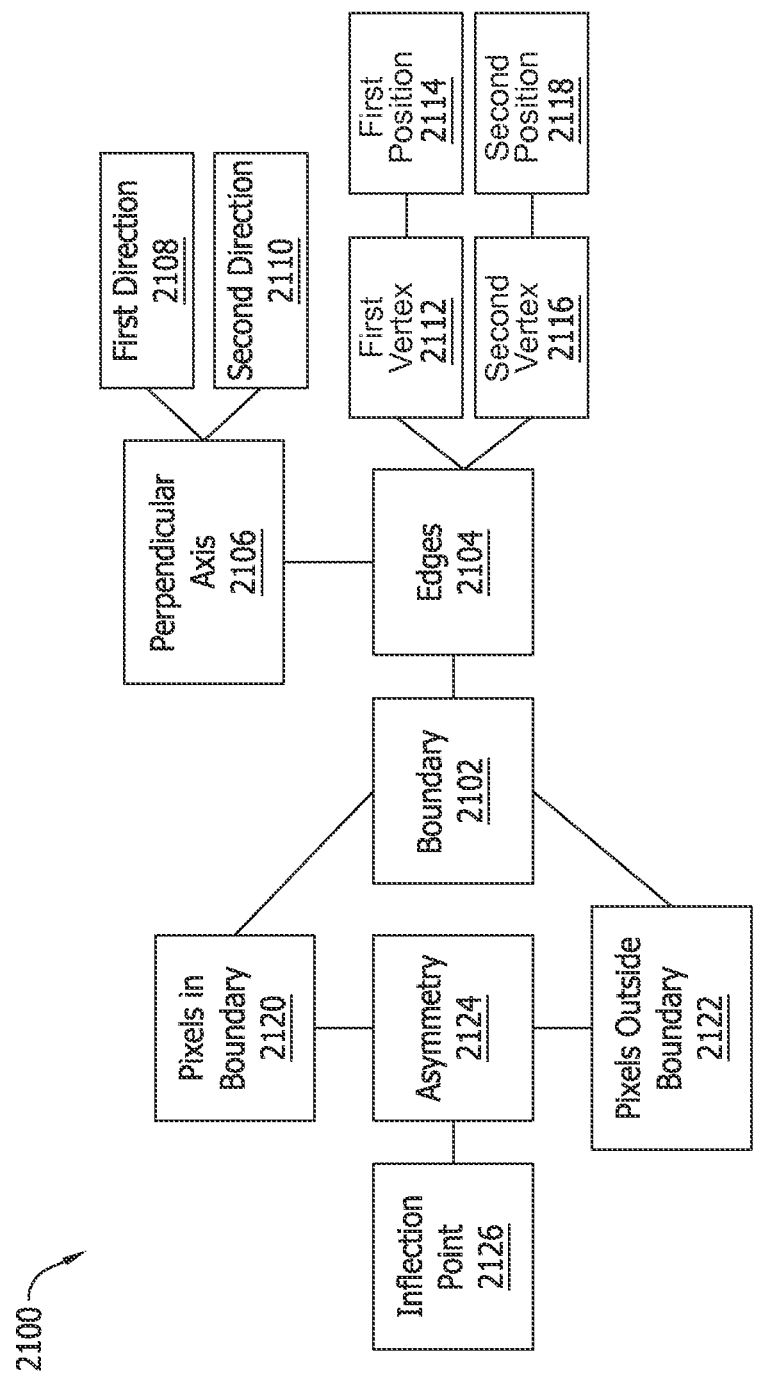
FIG. 21 is a diagram of a relationship among elements analyzed by the boundary determination computing device of FIG. 1 in adjusting a boundary.

FIG. 21 is a diagram of a relationship 2100 among elements analyzed by boundary determination computing device 102 in adjusting a boundary 2102 (e.g., bounding rectangle 1700). Boundary 2102 includes a plurality of edges 2104. Each edge 2104 includes a first vertex 2112 at a first position 2114 and a second vertex 2116 at a second position 2118. Additionally, each edge 2104 has a perpendicular axis 2106. In at least some implementations, as described above, boundary determination computing device 102 translates ("sweeps") each edge 2104 along its corresponding perpendicular axis 2106 in a first direction 2108 and a second direction 2110 to refine boundary 2102, as described above. In other implementations, boundary determination computing device 102 moves a vertex of each edge 2104 to rotate the edge 2104 and thereby adjust the boundary 2102. With each movement described above, boundary determination computing device 102 compares the median value of pixels along the edge 2104 within the boundary 2102 (e.g., pixels in boundary 2120) to the median value of pixels along the edge 2104 outside the boundary 2102 (e.g., pixels outside boundary 2122) and determines an asymmetry 2124, as described above, and at least in some implementations, an inflection point 2126, representing an abrupt change in the asymmetry 2124.

Figure 22:
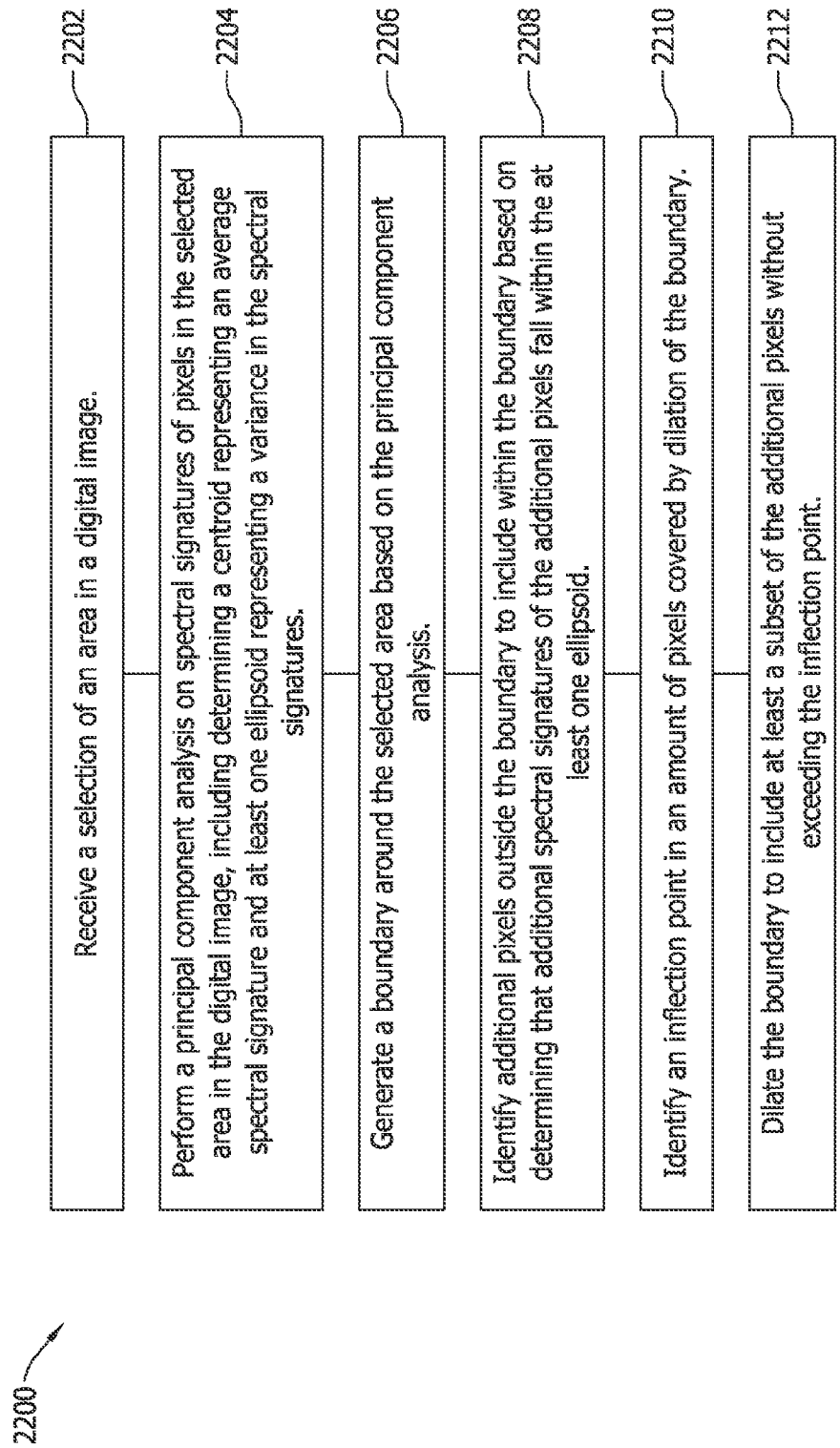
FIG. 22 is a flowchart of an example process performed by the boundary determination computing device for determining a boundary of a feature in a digital image.

FIG. 22 is a flowchart of an example process 2200 performed by the boundary determination computing device 102 for determining a boundary (e.g., boundary 2102) of a feature (e.g., feature 302) in a digital image (e.g., image 300). Initially, boundary determination computing device 102 receives 2202 a selection (e.g., selection 400) of an area in a digital image (e.g., image 300). Additionally, boundary determination computing device 102 performs 2204 a principal component analysis (e.g., principal component analysis 1501) on spectral signatures (e.g., spectral signatures 505) of pixels 501 in the selected area in the digital image 300, including determining a centroid 1510 representing an average spectral signature 1512 and at least one ellipsoid 1506 representing a variance 1508 in the spectral signatures 505. Additionally, boundary determination computing device 102 generates 2206 a boundary 2102 around the selected area (e.g., selection 400) based on the principal component analysis 1501. Additionally, boundary determination computing device 102 identifies 2208 additional pixels 501 outside the boundary 2102 to include within the boundary 2102 based on determining that additional spectral signatures 505 of the additional pixels 501 fall within the at least one ellipsoid 1506. Additionally, boundary determination computing device 102 identifies 2210 an inflection point 1208 in an amount of pixels 501 covered by dilation of the boundary 2102. Additionally, boundary determination computing device 102 dilates 2212 the boundary 2102 to include at least a subset of the additional pixels without exceeding the inflection point 1208.

In some implementations, boundary determination computing device 102 generates multiple ellipsoids (e.g., ellipsoid 1506 and ellipsoid 1520). In some implementations, boundary determination computing device 102 generates at least one spectral distance image (e.g., spectral distance image 900). In some implementations, boundary determination computing device 102 generates at least one spectral gradient magnitude image (e.g., spectral gradient magnitude image 1000). In some implementations, boundary determination computing device 102 normalizes the at least one spectral distance image (e.g., spectral distance image 900) and the at least one spectral gradient magnitude image (spectral gradient magnitude image 1000) and adds the normalized spectral distance image (e.g., normalized spectral distance image 902) and the normalized spectral gradient magnitude image (e.g., normalized spectral gradient magnitude image 1002) together.

In some implementations, boundary determination computing device 102 determines an asymmetry (e.g., asymmetry 2124) in spectral signatures (e.g., spectral signatures 505) of pixels adjacent to an edge (e.g., edge 2104) of the boundary 2102 (e.g., pixels in boundary 2120 and pixels outside boundary 2122) and shifts the edge (e.g., edge 1800) in a direction perpendicular (e.g., first direction 1804 or second direction 1806) to the edge (e.g., edge 1800) based upon the determined asymmetry (e.g., asymmetry 2124). In some implementations, boundary determination computing device 102 determines an asymmetry inflection point (e.g., inflection point 2126) in the determined asymmetry (e.g., asymmetry 2124) and shifts the edge (e.g., edge 2104) to not exceed the asymmetry inflection point (e.g., inflection point 2126).

In some implementations, boundary determination computing device 102 determines an asymmetry (e.g., asymmetry 2124) in spectral signatures (e.g., spectral signatures 505) of pixels adjacent to an edge (e.g., edge 2104) of the boundary 2102 (e.g., pixels in boundary 2120 and pixels outside boundary 2122), wherein the edge 2104 includes at least two vertices (e.g., first vertex 2112 and second vertex 2116), and adjusts a position (e.g., first position 2114 or second position 2118) of at least one of the vertices (e.g., first vertex 2112 or second vertex 2116) based upon the determined asymmetry 2124. In some implementations, boundary determination computing device 102 determines an asymmetry inflection point (e.g., inflection point 2126) in the determined asymmetry 2124 and moves at least one of the vertices (e.g., first vertex 2112 or second vertex 2116) to not exceed the asymmetry inflection point 2126.

A technical effect of systems and methods described herein includes at least one of (a) receiving a selection of an area in a digital image; (b) performing a principal component analysis on spectral signatures of pixels in the selected area in the digital image, including determining a centroid representing an average spectral signature and at least one ellipsoid representing a variance in the spectral signatures; (c) generating a boundary around the selected area based on the principal component analysis; (d) identifying additional pixels outside the boundary to include within the boundary based on determining that additional spectral signatures of the additional pixels fall within the at least one ellipsoid; (e) identifying an inflection point in an amount of pixels covered by dilation of the boundary; and (f) dilating the boundary to include at least a subset of the additional pixels without exceeding the inflection point.

As compared to known methods and systems for determining a boundary of a feature in a low contrast remote sensing image, the systems and methods described herein reduce the amount of human intervention required to identify boundaries of features. Accordingly, features in low contrast remote sensing images can be quickly and accurately identified by a machine rather than requiring extensive assistance from a human image analyst.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A boundary determination system for determining boundaries of features in a digital image, said boundary determination system comprising a processor coupled to a memory, said processor is configured to:
   receive a selection of an area in a digital image;
   perform a principal component analysis on spectral signatures of pixels in the selected area in the digital image, including determining a centroid representing an average spectral signature and at least one ellipsoid representing a variance in the spectral signatures;
   generate a boundary around the selected area based on the principal component analysis;
   identify additional pixels outside the boundary to include within the boundary based on determining that additional spectral signatures of the additional pixels fall within the at least one ellipsoid;
   identify an inflection point in an amount of pixels covered by dilation of the boundary; and
   dilate the boundary to include at least a subset of the additional pixels without exceeding the inflection point.

2. The boundary determination system of claim 1, wherein said processor is further configured to generate multiple ellipsoids.

3. The boundary determination system of claim 1, wherein said processor is further configured to generate at least one spectral distance image.

4. The boundary determination system of claim 3, wherein said processor is further configured to generate at least one spectral gradient magnitude image.

5. The boundary determination system of claim 4, wherein said processor is further configured to:
   normalize the at least one spectral distance image and the at least one spectral gradient magnitude image; and
   add the normalized spectral distance image and the normalized spectral gradient magnitude image together.

6. The boundary determination system of claim 1, wherein said processor is further configured to:
   determine an asymmetry in spectral signatures of pixels adjacent to an edge of the boundary; and
   shift the edge in a direction perpendicular to the edge based upon the determined asymmetry.

7. The boundary determination system of claim 6, wherein said processor is further configured to:
   determine an asymmetry inflection point in the determined asymmetry; and
   shift the edge to not exceed the asymmetry inflection point.

8. The boundary determination system of claim 1, wherein said processor is further configured to:
   determine an asymmetry in spectral signatures of pixels adjacent to an edge of the boundary, the edge including at least two vertices; and
   adjust a position of at least one of the vertices based upon the determined asymmetry.

9. The boundary determination system of claim 8, wherein said processor is further configured to:
   determine an asymmetry inflection point in the determined asymmetry; and
   move the at least one of the vertices to not exceed the asymmetry inflection point.

10. A method for determining boundaries of features in a digital image, said method is performed by a boundary determination computing device, said method comprising:
    receiving, by the boundary determination computing device, a selection of an area in a digital image;
    performing, by the boundary determination computing device, a principal component analysis on spectral signatures of pixels in the selected area in the digital image, including determining a centroid representing an average spectral signature and at least one ellipsoid representing a variance in the spectral signatures;
    generating, by the boundary determination computing device, a boundary around the selected area based on the principal component analysis;
    identifying, by the boundary determination computing device, additional pixels outside the boundary to include within the boundary based on determining that additional spectral signatures of the additional pixels fall within the at least one ellipsoid;
    identifying, by the boundary determination computing device, an inflection point in an amount of pixels covered by dilation of the boundary; and
    dilating, by the boundary determination computing device, the boundary to include at least a subset of the additional pixels without exceeding the inflection point.

11. The method of claim 10, further comprising generating multiple ellipsoids.

12. The method of claim 10, further comprising generating at least one spectral distance image.

13. The method of claim 12, further comprising generating at least one spectral gradient magnitude image.

14. The method of claim 13, further comprising:
    normalizing the at least one spectral distance image and the at least one spectral gradient magnitude image; and
    adding the normalized spectral distance image and the normalized spectral gradient magnitude image together.

15. The method of claim 10, further comprising:
    determining an asymmetry in spectral signatures of pixels adjacent to an edge of the boundary; and
    shifting the edge in a direction perpendicular to the edge based upon the determined asymmetry.

16. The method of claim 15, further comprising:
    determining an asymmetry inflection point in the determined asymmetry; and
    shifting the edge to not exceed the asymmetry inflection point.

17. The method of claim 10, further comprising:
    determining an asymmetry in spectral signatures of pixels adjacent to an edge of the boundary, the edge including at least two vertices; and
    adjusting a position of at least one of the vertices based upon the determined asymmetry.

18. The method of claim 17, further comprising:
    determining an asymmetry inflection point in the determined asymmetry; and
    moving the at least one of the vertices to not exceed the asymmetry inflection point.

19. A computer-readable medium having computer-executable instructions stored thereon, wherein when executed by a boundary determination computing device including a processor, said computer-executable instructions cause the boundary determination computing device to:
    receive a selection of an area in a digital image;

perform a principal component analysis on spectral signatures of pixels in the selected area in the digital image, including determining a centroid representing an average spectral signature and at least one ellipsoid representing a variance in the spectral signatures;

generate a boundary around the selected area based on the principal component analysis;

identify additional pixels outside the boundary to include within the boundary based on determining that additional spectral signatures of the additional pixels fall within the at least one ellipsoid;

identify an inflection point in an amount of pixels covered by dilation of the boundary; and dilate the boundary to include at least a subset of the additional pixels without exceeding the inflection point.

* * * * *